(12) United States Patent
Shirakawa et al.

(10) Patent No.: US 7,450,056 B2
(45) Date of Patent: Nov. 11, 2008

(54) SEARCH/DETECTION APPARATUS

(75) Inventors: Kazuo Shirakawa, Kawasaki (JP);
Naofumi Ohkubo, Kawasaki (JP);
Tetsuo Seki, Kawasaki (JP); Kanako Honda, Kobe (JP); Osamu Isaji, Kobe (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 197 days.

(21) Appl. No.: 11/421,102

(22) Filed: May 31, 2006

(65) Prior Publication Data
US 2007/0188373 A1 Aug. 16, 2007

(30) Foreign Application Priority Data
Feb. 15, 2006 (JP) ............... 2006-038455

(51) Int. Cl.
G01S 7/292 (2006.01)
(52) U.S. Cl. ............... 342/159; 342/70; 342/83
(58) Field of Classification Search ........... 342/70–72, 342/82–88, 159–162
See application file for complete search history.

(56) References Cited

U.S. PATENT DOCUMENTS

| 5,274,380 | A | 12/1993 | Yatsuka et al. |
| 5,280,288 | A | 1/1994 | Sherry et al. |
| 5,345,470 | A | 9/1994 | Alexander |
| 5,828,333 | A | 10/1998 | Richardson et al. |
| 7,002,511 | B1* | 2/2006 | Ammar et al. ............... 342/134 |
| 7,158,077 | B2* | 1/2007 | Brosche ....................... 342/137 |
| 2002/0130810 | A1* | 9/2002 | Gottwald et al. ............. 342/159 |
| 2003/0179131 | A1* | 9/2003 | Brosche ....................... 342/159 |
| 2004/0148090 | A1 | 7/2004 | Melen |
| 2005/0060069 | A1 | 3/2005 | Breed et al. |
| 2005/0156780 | A1* | 7/2005 | Bonthron et al. ............. 342/107 |

FOREIGN PATENT DOCUMENTS

| JP | 6-160512 | 6/1994 |
| WO | WO 94/04939 | 3/1994 |

OTHER PUBLICATIONS

"Novel method of decreasing influence of phase noise on FMCW radar", Kulpa, K.S. Radar, 2001 CIE International Conference on, Proceedings 2001 pp. 319-323.*
Corrected Extended European Search Report issued in corresponding European Patent Application No. 06011211.7, on Dec. 19, 2007.

* cited by examiner

Primary Examiner—John B Sotomayor
(74) Attorney, Agent, or Firm—Staas & Halsey LLP

(57) ABSTRACT

The search/detection apparatus modulates a carrier signal by a modulation signal, generates a probe signal for detecting the location of a target, and receives the probe signal reflected by the target as an echo signal. Then, the search/detection apparatus detects the existence of an interference signal other than the echo signal from the received signal and modifies the parameter of the modulation signal and/or carrier signal.

16 Claims, 25 Drawing Sheets

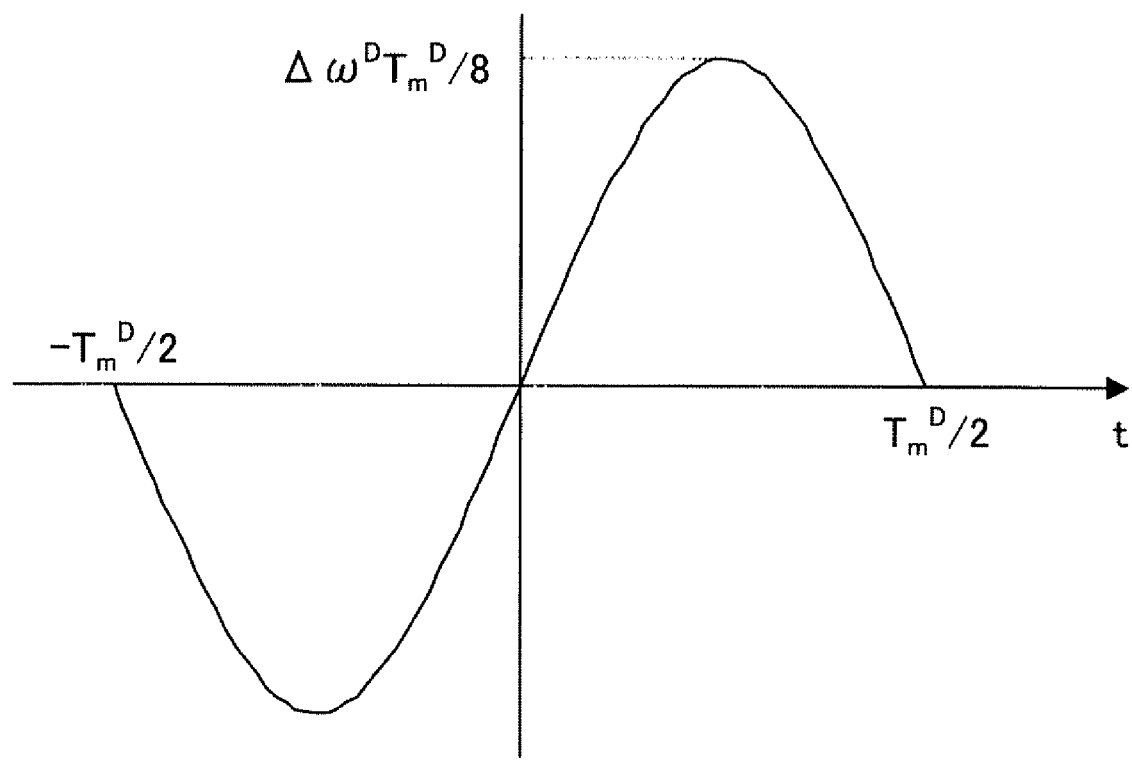
F I G. 3B

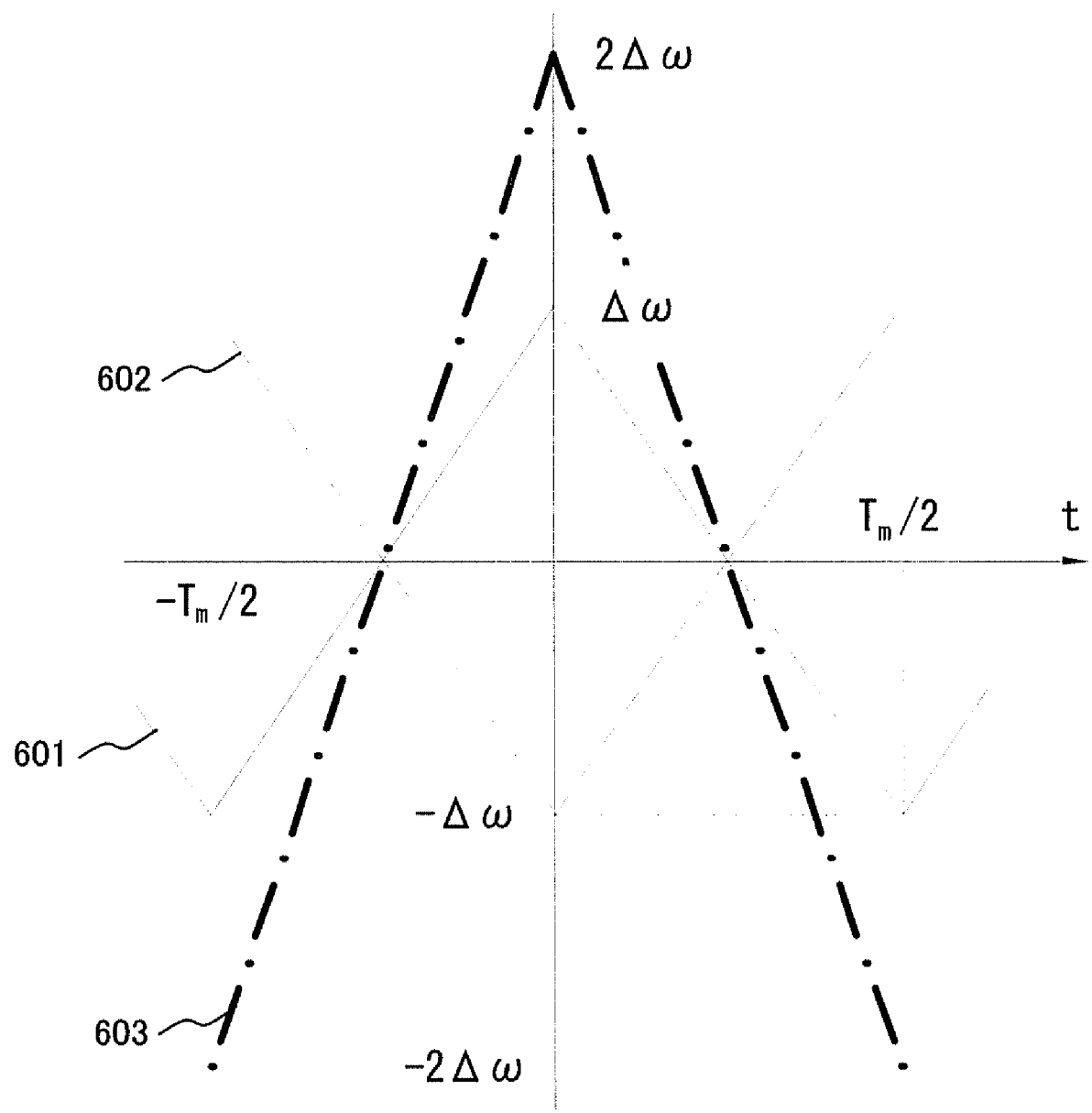
F I G. 6

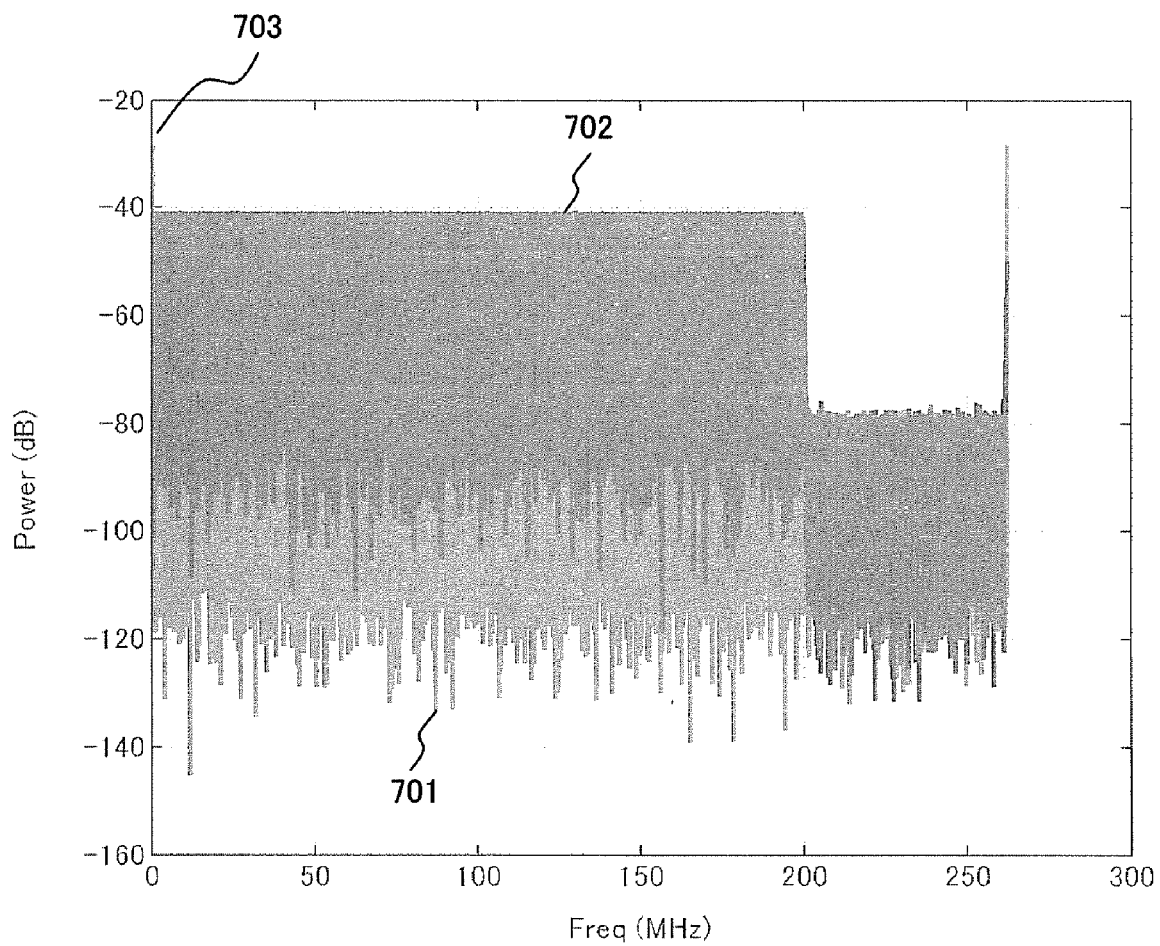
F I G. 7

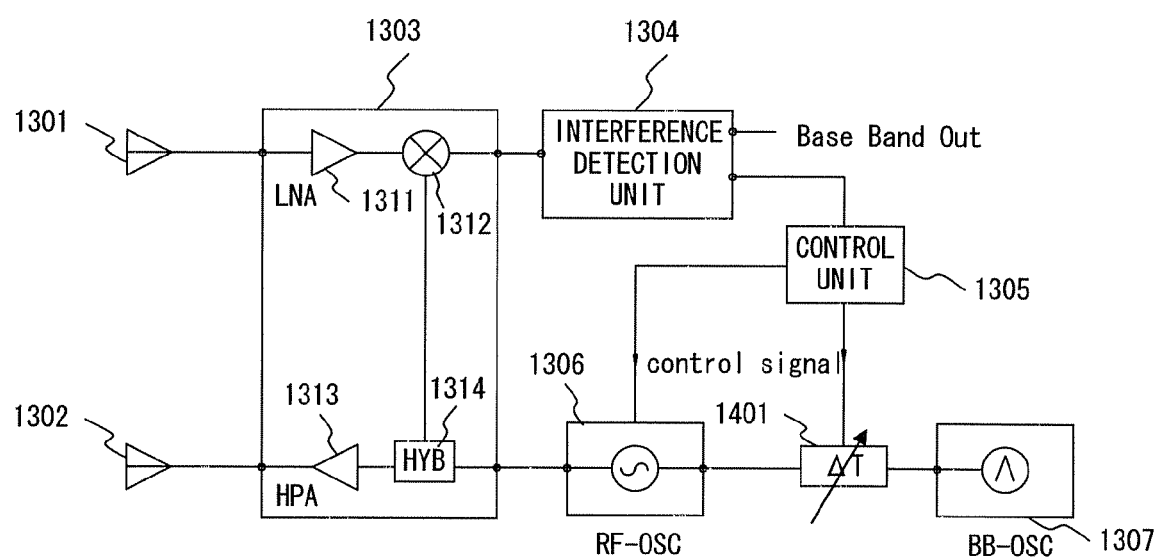
F I G. 14

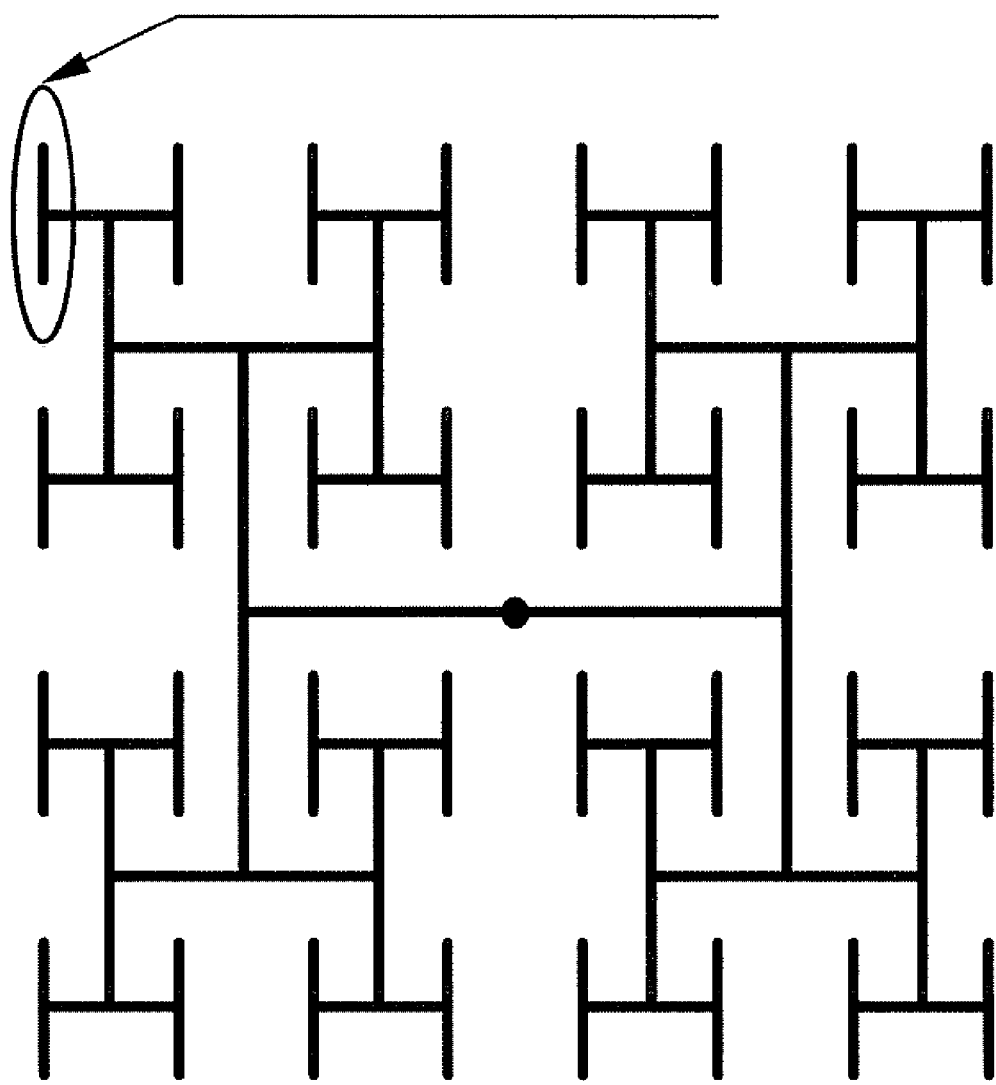
F I G. 1 7

| $\omega_c$ | $\Delta\omega$ | $T_m$ | $\Delta T$ |
|---|---|---|---|

| X | X | X | X | X | X | X | X |
|---|---|---|---|---|---|---|---|

& & & & & & & &

| U | U | U | U | V | V | V | V |
|---|---|---|---|---|---|---|---|

↓ ↓ ↓ ↓ ↓ ↓ ↓ ↓

| Z | Z | Z | Z | Z | Z | Z | Z |
|---|---|---|---|---|---|---|---|

SEARCH/DETECTION APPARATUS

BACKGROUND OF THE INVENTION

1. Field of the Invention

The present invention relates to a technology for eliminating interference signals from another search/detection apparatus and stably identifying a target to be searched for by the relevant search/detection apparatus in an environment where there are a plurality of search/detection apparatuses for searching for targets and detecting the number, locations, and the like of the targets.

2. Description of the Related Art

Most pieces of conventional radar equipment used on vehicles or the like adopt a frequency modulated continuous wave (FMCW) as a probe signal because of its simple configuration.

FIG. 1 shows an example of the configuration of such vehicle-mounted FMCW radar equipment. The FMCW radar equipment 12 shown in FIG. 1 is mounted on a vehicle D, and comprises a receiving antenna 31, a receiving unit (RX) 32, an amplification unit 33, a fast Fourier transformation unit (FFT) 34, a transmitting antenna 35, a transmitting unit (TX) 36, and an oscillation unit 37.

The receiving unit 32 comprises a low-noise amplifier 41 and a mixer 42. The amplification unit 33 comprises an intermediate frequency amplifier (IFA) 43 and a low-pass filter (LPF) 44. The transmitting unit 36 comprises a high-power amplifier 46, a branch unit (HYB) 45, and a radio frequency oscillator (RF-OSC) 47. The oscillation unit 37 comprises a base-band oscillator (BB-OSC) 48.

The base-band oscillator 48 generates, for example, a triangle wave from a clock signal CLK and outputs it to the transmitting unit 36. The radio frequency oscillator 47 of the transmitting unit 36 is a voltage-controlled oscillator (VCO) or the like and generates a transmitting signal frequency-modulated by the triangle wave. The branch unit 45 outputs the transmitting signal to the high-power amplifier 46 and the mixer 42. The transmitting antenna 35 transmits a transmitting wave amplified by the high-power amplifier 46. A signal transmitted from the transmitting antenna 35 is reflected by another vehicle U, which is its target and is received by the receiving antenna 31.

The low-noise amplifier 41 amplifies a received signal. The mixer 42 generates a beat signal by mixing the received signal and a part of the transmitting signal. The intermediate frequency amplifier 43 amplifies the beat signal. The low-pass filter 44 eliminates a high-frequency component from the amplified beat signal and generates a base-band signal. The fast Fourier transformation unit 34 performs the fast Fourier transformation of the base-band signal and outputs information about a distance r up to the vehicle U, the relative speed v of the vehicle U, and the like.

The following patent reference 1 relates to a system for avoiding interference in microwave radar equipment using a Gunn diode as an oscillation source.

Patent reference 1: Japanese Patent Application Publication No. 06-160512

The above-described FMCW radar equipment has the following problems.

An autonomous search/detection apparatus such as radar equipment must search for a target and measure specifications, such as its distance and the like, depending only on a signal originated by the relevant apparatus. Therefore, if there is another piece of similar equipment in an observation space, such as an oncoming vehicle, an interference component due to another probe signal mixes into the observation band of the relevant equipment to make it difficult to identify the target.

For example, the vehicle U in FIG. 1 is an oncoming vehicle, a forward running vehicle or the like. If the vehicle U mounts the same radar equipment 11 as the FMCW radar equipment 12, the receiving antenna 31 receives a signal transmitted by the transmitting antenna 21 of the radar equipment 11 as well as a probe signal from the radar equipment 12 which is reflected by the vehicle U. Therefore, an interference component due to the transmitting signal from the vehicle U mixes into the base-band signal.

If information about another probe signal can be obtained by some means, it is not always impossible to eliminate the interference component. However, in a situation where various forms of equipment are mixed, the equipment configuration becomes complex and its signal processing cost increases. In the application of vehicle-mounted radar equipment that requires a high-speed response under the control of a low-performance central processing unit (CPU) or the like, it becomes a fatal disadvantage.

Although the search/detection apparatus measures a distance using the echo of a probe signal originated by the relevant apparatus, its receiving power attenuates in proportion to the fourth power of a distance up to a target while the receiving power from an interference signal source attenuates in proportion to the second power of the distance. In other words, generally the power level of an interference signal is far larger than the power level of a necessary signal. If no countermeasures are taken, there is a high possibility that the necessary signal may be masked by the interference signal.

SUMMARY OF THE INVENTION

It is an object of the present invention to prevent an echo signal from a target from being masked by an interference signal by using a simple configuration in a search/detection apparatus, such as radar equipment.

The first and second search/detection apparatus of the present invention comprises a generation device, a transmitting sensor, a receiving sensor, an extraction device, an interference detection device, and a control device.

In the first search/detection apparatus, the generation device modulates a carrier signal by a modulation signal and generates a probe signal for detecting the location of a target. The transmitting sensor radiates the probe signal. The receiving sensor receives the probe signal reflected by the target as an echo signal. The extraction device extracts the distance information about the target from the echo signal.

The interference detection device detects the existence of an interference signal other than the echo signal from the signal received by the receiving sensor and outputs a detection signal. The control device modifies the parameter of the modulation signal when receiving the detection signal from the interference detection device.

In the second search/detection apparatus, the generation device comprises a voltage (or current) controlled oscillation device for generating a carrier signal. The voltage (or current) controlled oscillation device modulates the carrier signal by a modulation signal and generates a probe signal for detecting the location of a target. The transmitting sensor radiates the probe signal. The receiving sensor receives the probe signal reflected by the target as an echo signal. The extraction device extracts the distance information about the target from the echo signal.

The interference detection device detects the existence of an interference signal other than the echo signal from the signal received by the receiving sensor and outputs a detection signal. The control device modifies the parameter of the carrier signal when receiving the detection signal from the interference detection device.

BRIEF DESCRIPTION OF THE DRAWINGS

FIG. 3B shows phase shift by modulation input;
FIG. 6 shows the first frequency shift of an interference component;
FIG. 7 shows the rise of a noise floor by the interference component;
FIG. 14 shows the second FMCW radar equipment;
FIG. 17 shows the first fractal structure.

DESCRIPTION OF THE PREFERRED EMBODIMENTS

The preferred embodiments of the present invention are described in detail below with reference to the drawings.

Figure 2:
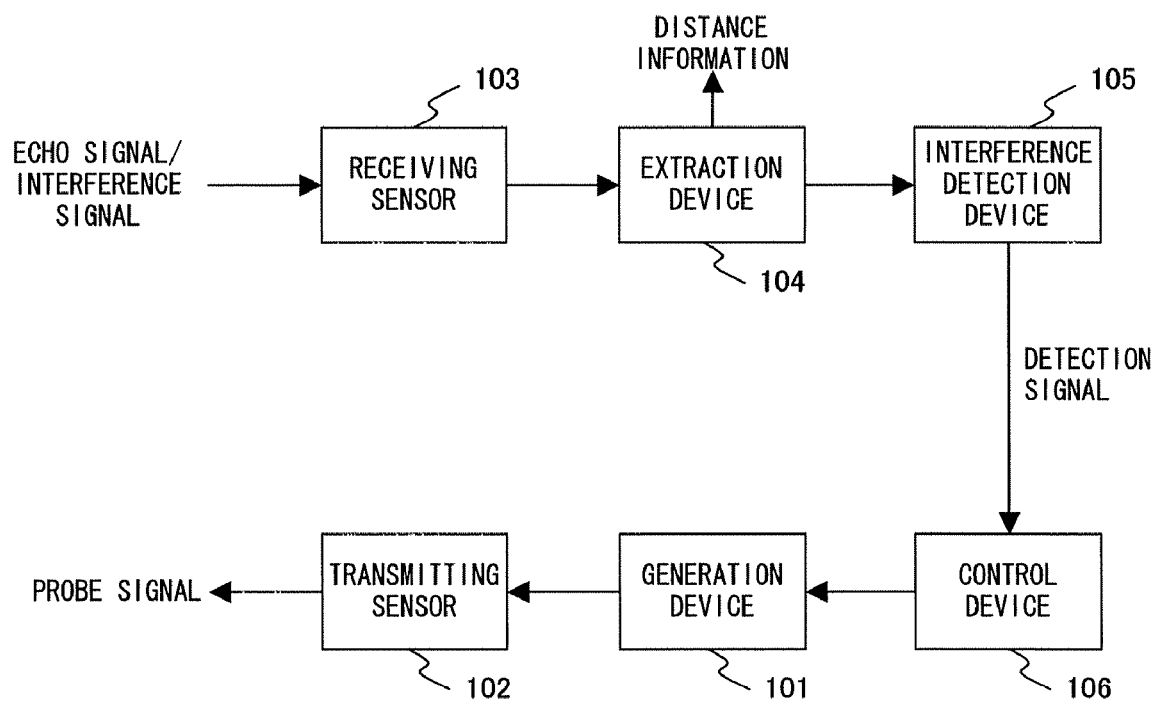
FIG. 2 shows the principle of the search/detection apparatus of the present invention.

FIG. 2 shows the principle of the first and second search/detection apparatus of the present invention. The search/detection apparatus shown in FIG. 2 comprises a generation device 101, a transmitting sensor 102, a receiving sensor 103, an extraction device 104, an interference detection device 105, and a control device 106.

In the first search/detection apparatus, the generation device 101 modulates a carrier signal by a modulation signal and generates a probe signal for detecting the location of a target. The transmitting sensor 102 radiates the probe signal. The receiving sensor 103 receives the probe signal reflected by the target as an echo signal. The extraction device 104 extracts the distance information about the target from the echo signal.

The interference detection device 105 detects the existence of an interference signal other than the echo signal from the signal received by the receiving sensor and outputs a detection signal. The control device 106 modifies the parameter of the modulation signal when receiving the detection signal from the interference detection device 105. In this case, the control device 106 modifies at least one of the initial time, phase, and cycle of the modulation signal as the parameter of the modulation signal.

The interference detection device 105 determines the existence/non-existence of an interference signal, for example, by monitoring the power level of an interference signal included in the receiving signal, and when detecting the existence of an interference signal, it outputs a detection signal to the control device 106. Upon receipt of this signal, the control device 106 modifies the initial time, phase, or cycle of the modulation signal.

Thus, a new probe signal is generated and radiated using the modulation signal after modification, and its echo signal is newly received. As described later, by modifying the initial time or the like of the modulation signal, an echo signal masked by an interference signal can be made observable and the distance information of a target can be extracted from the new echo signal.

In the second search/detection apparatus, the generation device 101 comprises a voltage (or current)-controlled oscillation device for generating a carrier signal. The voltage (or current)-controlled oscillation device modulates the carrier signal by a modulation signal and generates a probe signal for detecting the location of a target. The transmitting sensor 102 radiates the probe signal. The receiving sensor 103 receives the probe signal reflected by the target as an echo signal. The extraction device 104 extracts the distance information about the target from the echo signal.

The interference detection device 105 detects the existence of an interference signal other than the echo signal from the signal received by the receiving sensor and outputs a detection signal. The control device 106 modifies the parameter of the carrier signal when receiving the detection signal from the interference detection device 105. In this case, the control device 106 modifies at least one of the center frequency and modulation bandwidth of the carrier signal as the parameter of the carrier signal.

By modifying the center frequency and the like of the carrier signal, as in the first search/detection apparatus, an echo signal masked by an interference signal can be made observable and the distance information of a target can be extracted from the new echo signal.

The generation device 101 corresponds, for example, to the base-band oscillator and radio frequency oscillator in the FMCW radar equipment shown in FIGS. 13 through 15, 21 and 22, which will be described later. The transmitting sensor 102 and the receiving sensor 103, corresponds, for example, to the transmitting antenna and the receiving antenna, respectively. The extraction device 104 corresponds, for example, to the mixer in the receiving system and a part of the interference detection unit. The interference detection device 105 and the control device 106 correspond, for example, to the interference detection unit and the control unit, respectively.

According to the present invention, a probe signal is radiated from the search/detection apparatus such as radar equipment, and when an interference signal as well as an echo signal mix into a receiving signal, by modifying the parameter of a carrier signal or a modulation signal, the echo signal can be prevented from being masked.

Figure 1:
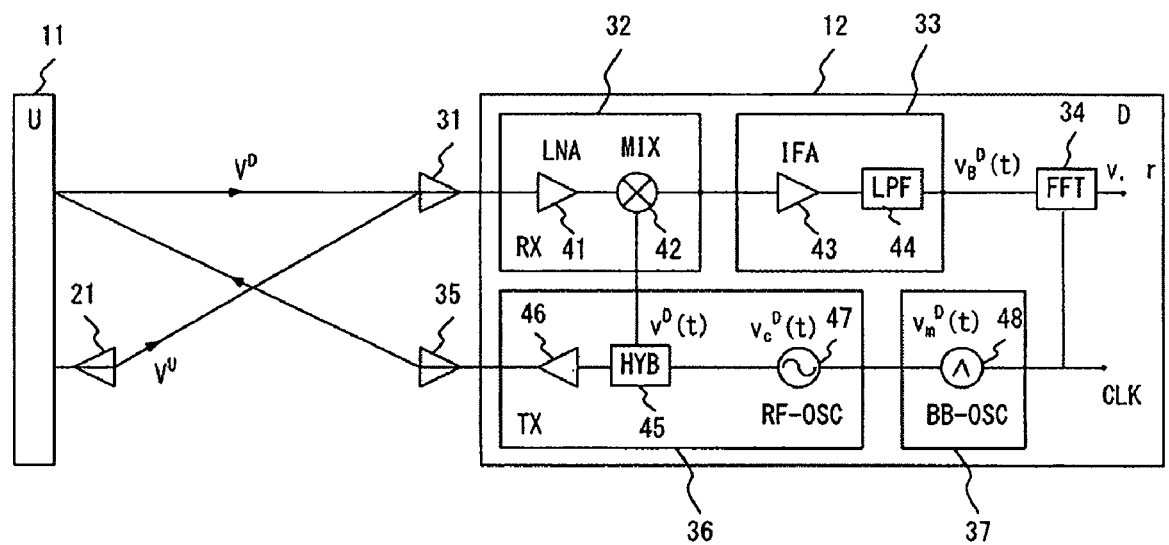
FIG. 1 shows the configuration of the conventional FMCW radar equipment.

As shown in FIG. 1, it is assumed that vehicles U and D mounting FMCW radar equipment 11 and 12, respectively, run on a road and the vehicle D searches for the vehicle U. In the following description, signals and parameters derived from the vehicles D and U are discriminated from each other by attaching affixes $^D$ and $^U$ to them, respectively.

Figure 3A:
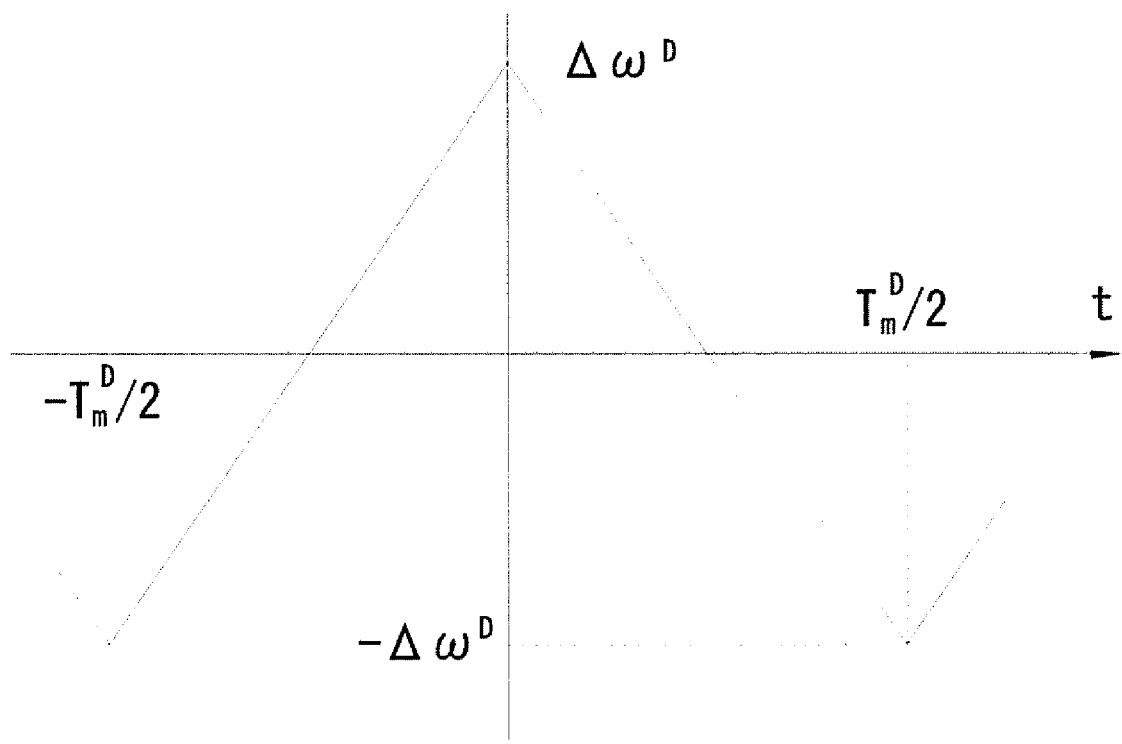
FIG. 3A shows frequency shift by modulation input.

Firstly, the vehicle D side is considered. When frequency modulation is applied to the radio frequency oscillator 47 by a triangle wave $v_m^D(t)$ (modulation signal) with a basic cycle $T_m^D$ outputted from the base-band oscillator 48, the frequency shift $f_m^D(t)$ of the radio frequency oscillator 47 becomes as shown in FIG. 3A. In FIG. 3A, $\Delta\omega^D$ represents the maximum single-side angle frequency shift (corresponding to half modulation bandwidth). Phase shift $h^D(t)$ obtained by integrating $f_m^D(t)$ becomes as shown in FIG. 3B. The respective waveforms for one cycle of $f_m^D(t)$ and $h^D(t)$ are expressed as follows.

$$f_m^D(t) = \begin{cases} \frac{4\Delta\omega^D}{T_m^D}t + \Delta\omega^D: & -\frac{T_m^D}{2} \leq t < 0 \\ -\frac{4\Delta\omega^D}{T_m^D}t + \Delta\omega^D: & 0 \leq t < \frac{T_m^D}{2} \end{cases} \quad (1)$$

$$h^D(t) = \int_{-\infty}^{t} f_m^D(x)dx \rightarrow \begin{cases} \frac{2\Delta\omega^D}{T_m^D}t^2 + \Delta\omega^D t: & -\frac{T_m^D}{2} \leq t < 0 \\ -\frac{2\Delta\omega^D}{T_m^D}t^2 + \Delta\omega^D t: & 0 \leq t < \frac{T_m^D}{2} \end{cases} \quad (2)$$

Since each of these waveforms clearly has a cycle $T_m^D$, as a result, an input signal $v^D(t)$ to the branch unit (HYB) 45 is also expressed as follows.

$$\begin{aligned} v^D(t) &= v_c^D(t)v_s^D(t) \\ &= \exp(j\omega_c^D t)\exp[jh^D(t)] \\ &= \exp(j\omega_c^D t)\sum_{n=-\infty}^{\infty} h_n^D \exp(jn\omega_m^D t) \end{aligned} \quad (3)$$

However, $v_c^D(t)$ represents the output signal (carrier signal) of the radio frequency oscillator 47 if there is no modulation and $v_s^D(t)$ represents a modulation component in an equivalent low-frequency system expression. $\omega_c^D$ represents the center angle frequency (corresponding to carrier frequency) of the radio frequency oscillator 47 and $h_m^D$ represents the Fourier expansion coefficient of $\exp[jh^D(t)]$. $\omega_m^D = 2\pi/T_m^D$.

Figure 4:
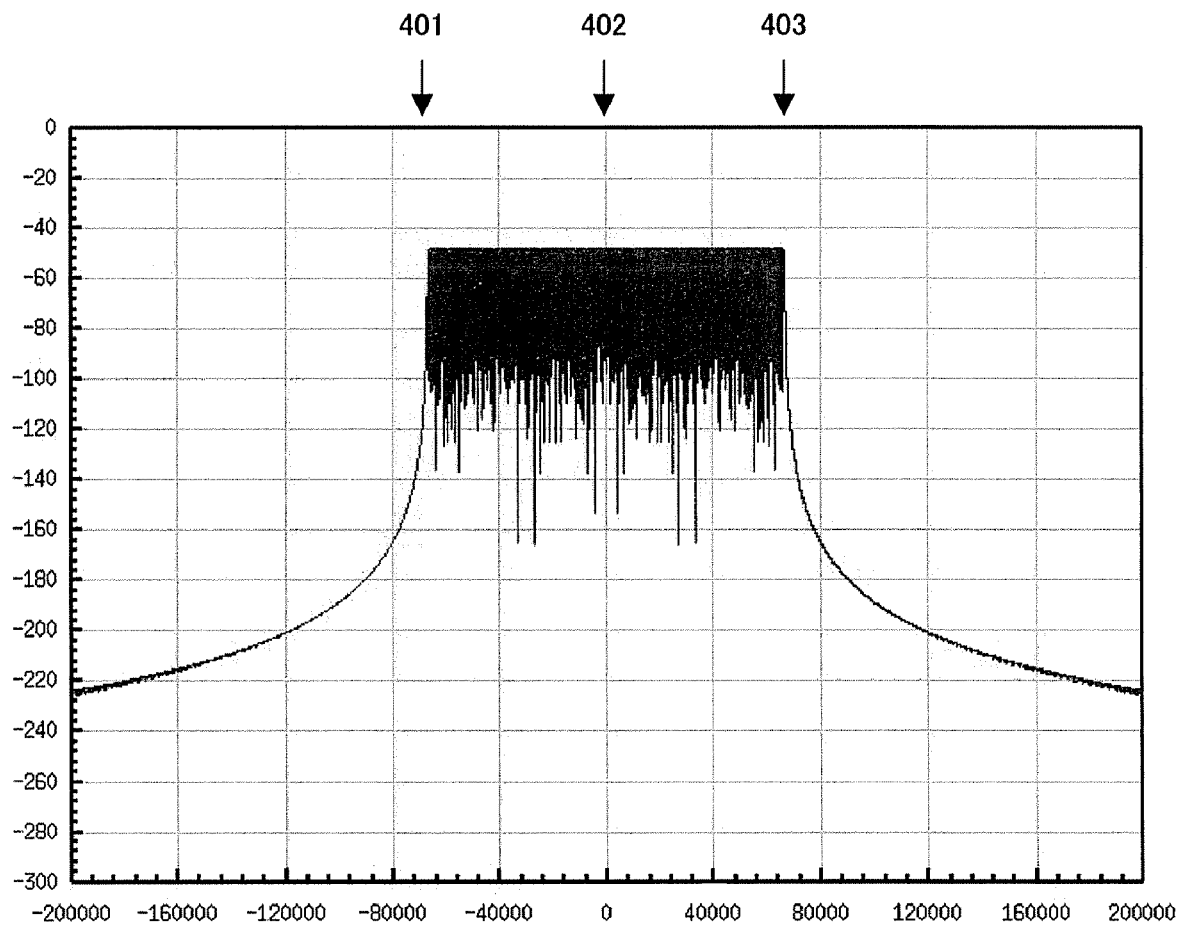
FIG. 4 shows the spectrum of a transmitting signal.

FIG. 4 shows an example of a method for calculating the spectrum of a transmitting signal $v^D(t)$ using equation (3). The horizontal and vertical axes of FIG. 4 represent frequency index and power, respectively. The location 402 of frequency index 0 corresponds to $\omega_c^D$ and locations 401 and 403 on its each side correspond to $-\Delta\omega^D$ and $\Delta\omega^D$, respectively.

Next, it is assumed that the vehicle U runs at a location a line-of-sight distance r away from the vehicle D at relative velocity v. In this case, if a return delay time between D and U is $\tau$ and Doppler frequency shift based on relative velocity v is $\omega_d$, the following received signal $v^D(t;\tau)$ and base-band signal $v_B^D(t)$ can be obtained. Here, for the sake of convenience, gain and loss due to circuits and propagation are neglected.

$$\text{Received } RF: v^D(t;\tau) = \exp\{j[\omega_c^D(t-\tau) + \omega_d(t-\frac{\tau}{2}) + h^D(t-\tau)]\} \quad (4)$$

$$\text{BaseBand: } v_B^D(t) = \quad (5)$$
$$v^D(t)v^{D*}(t;\tau) = \exp\{j[\omega_c^D\tau - \omega_d(t-\frac{\tau}{2}) + h^D(t) - h^D(t-\tau)]\}$$

In this case, if an FMCW probe signal with the parameters of a center frequency $\omega_c^U$, a modulation cycle $T_m^U$, and the maximum single-side angle frequency shift $\Delta\omega^U$ is radiated from the vehicle U toward the vehicle D, an interference signal $v_B^I(t)$ expressed as follows mixes into the base-band signal $v_B^D(t)$ of the vehicle D.

$$v_B^I(t) = v^D(t)v^{U*}(t;\tau) = \quad (6)$$
$$\exp\{j[\omega_c^U\frac{\tau}{2} + (\omega_c^D - \omega_c^U)t + \omega_d(t-\frac{\tau}{2}) + h^D(t) - h^U(t-\Delta T - \frac{\tau}{2})]\}$$

However, since $h^D$ and $h^U$ are independent of each other, the difference in initial time between these phase shifts is assumed to be $\Delta T$. Since the difference in the initial time of a carrier signal does not substantially influence the present invention, it is omitted here. In this case, the incoming power of echo signal $v_B^D(t)$ expressed by equation (5) attenuates in inverse proportion to $r^4$, while that of interference signal $v_B^I(t)$ expressed by equation (6) attenuates in inverse proportion to $r^2$. Therefore, if no countermeasures are taken, $v_B^D(t)$ is masked by $v_B^I(t)$ and it becomes difficult for the vehicle D to detect the vehicle U.

Generally, since the search/detection apparatus, such as radar equipment or the like, measures the specifications of a target in a frequency domain, the relative position between the spectrum $V_B^D$ of a necessary signal component $v_B^D$ and the spectrum $V_B^I$ of interference component $v_B^I$ must be obtained. In this case, the center frequency and occupied band of each spectrum are important. As to the former, it is clear that the center angle frequency $\omega$ of $V_B^D$ becomes 0 ($\omega=0$) (in the case of $\omega_d=0$), and that the center angle frequency of $V_B^I$ becomes $\omega_c^D - \omega_c^U (\equiv \Delta\omega_c)$.

However, the latter is governed by phase shift by an FMCW system. $V_B^D$ is determined by $h^D(t) - h^D(t-\tau)$ and $V_B^I$ is determined by $h^D(t) - h^U(t-\Delta T - \tau/2)$.

In this case, as to $V_B^D$, there is no change in that $V_B^D$ has a cycle $T_m^D$, its specific value can be given by the following Fourier expansion coefficient $v_{B,n}^D$ as in equation (3).

$$\begin{aligned} v_B^D(t) &= \exp\{j[\omega_c^D\tau - \omega_d(t-\frac{\tau}{2}) + h^D(t) - h^D(t-\tau)]\} \\ &= \sum_{n=-\infty}^{\infty} v_{B,n}^D \exp(-jn\omega_m^D t) \end{aligned} \quad (7)$$

Figure 5:
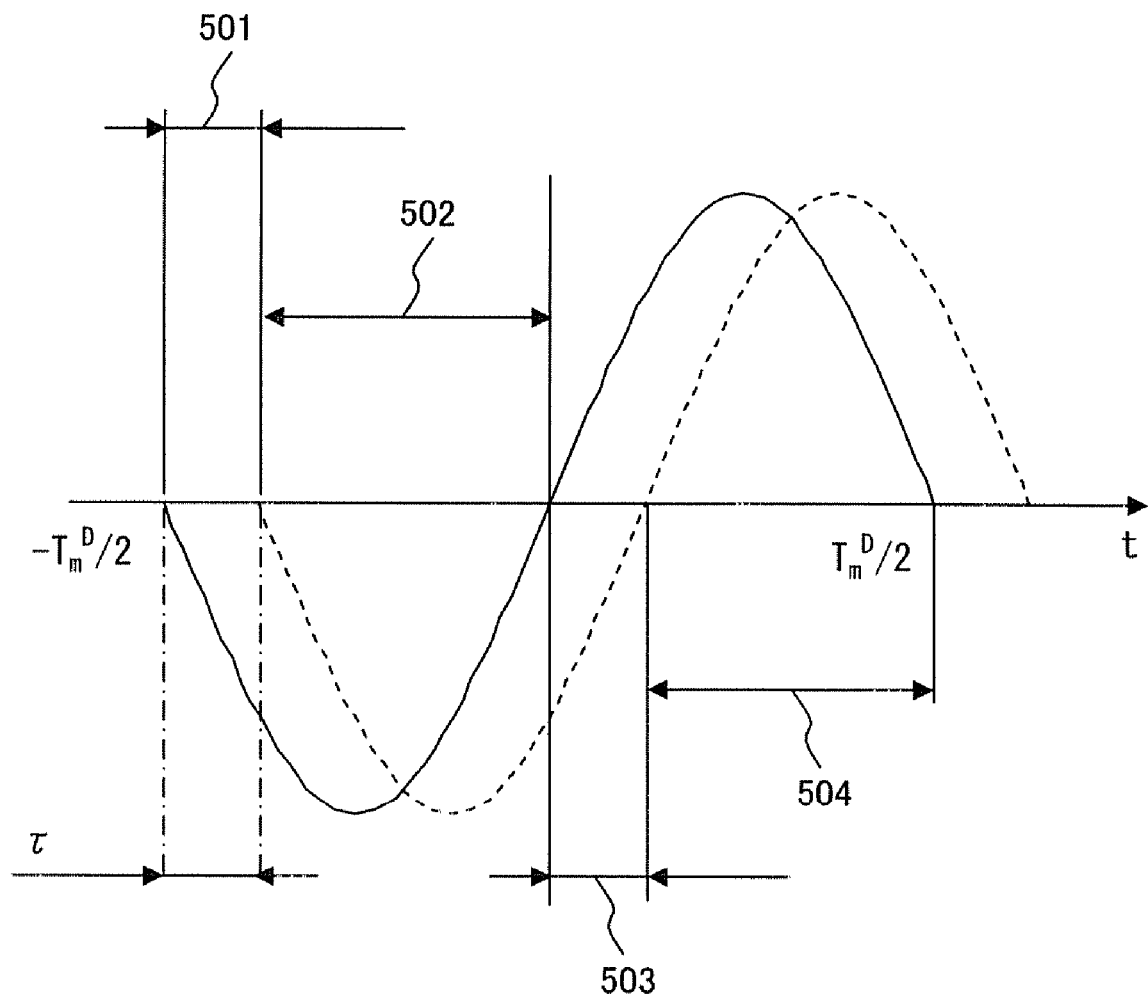
FIG. 5 shows the calculation method of a base-band spectrum.

However, since the integrand and integral range of $v_{B,n}^D$ varies depending on the size of $\tau$, it is preferable to divide a basic cycle $[-T_m^D/2, T_m^D/2]$ into four portions as shown in FIG. 5 and to perform the specific calculation of each area. The coefficients $v_{B,n}^D$ of areas 501 and 502 can be calculated as follows by omitting affixes B and D for convenience sake. Those of areas 503 and 504 can be similarly calculated.

$$v_n = \frac{1}{T_m} \int_{-\frac{T_m}{2}}^{\frac{T_m}{2}} v(t) \exp(-jn\omega_m t) dt = \qquad (8)$$

$$\frac{1}{T_m} \left[ \int_{-\frac{T_m}{2}}^{-\frac{T_m}{2}+\tau} + \int_{-\frac{T_m}{2}+\tau}^{0} + \int_{0}^{\tau} + \int_{\tau}^{\frac{T_m}{2}} \right] = v_n^1 + v_n^2 + v_n^3 + v_n^4$$

Area 501 (C and S are Fresnel integrals):

$$v_n^1 = \frac{\exp(j\phi_1)}{T_m} \sqrt{\frac{\pi T_m}{8\Delta\omega}} \left[ C(\alpha_1) - C(\beta_1) + j(S(\alpha_1) - S(\beta_1)) \right] \qquad (9)$$

$$\alpha_1 = \frac{1}{2}\sqrt{\frac{T_m}{2\pi\Delta\omega}} \left[ 3\tau - 2T_m + \frac{T_m}{4\Delta\omega}(\omega_d + n\omega_m) \right], \qquad (10)$$

$$\beta_1 = \frac{1}{2}\sqrt{\frac{T_m}{2\pi\Delta\omega}} \left[ \tau - 2T_m + \frac{T_m}{4\Delta\omega}(\omega_d + n\omega_m) \right]$$

$$\tau_1 = \tau - T_m + \frac{T_m}{4\Delta\omega}(\omega_d + n\omega_m),$$

$$\phi_1 = \frac{2\Delta\omega}{T_m}\tau^2 - 3\Delta\omega\tau + \Delta\omega T_m + \omega_c\tau + \omega_d\frac{\tau}{2} - \frac{\Delta\omega}{T_m}\tau_1^2$$

Area 502:

$$v_n^2 = \begin{cases} \frac{\exp(j\phi_2)}{T_m} \frac{1 - \exp\left[j\varphi_2\left(-\frac{T_m}{2}+\tau\right)\right]}{j\varphi_2}, & (\varphi_2 \neq 0) \\ \frac{\exp(j\phi_2)}{T_m}\left(\frac{T_m}{2}-\tau\right), & (\varphi_2 = 0) \end{cases} \qquad (11)$$

$$\varphi_2 = \frac{4\Delta\omega\tau}{T_m} - \omega_d - n\omega_m, \quad \phi_2 = \omega_c\tau + \omega_d\frac{\tau}{2} - \frac{2\Delta\omega}{T_m}\tau^2 + \Delta\omega\tau \qquad (12)$$

Equations (8) through (12) are the analytic expression of $V_B^D$. However, if $\tau$ is replaced with $\Delta T + \tau/2$, they express $V_B^I$ in the cases of $\Delta\omega^D = \Delta\omega^U$ and $T_m^D = T_m^U$. As to $V_B^D$ used for target search, since $\tau$ is sufficiently small, contribution from areas 502 and 504 is great, and in a frequency domain, it is found that $V_B^D$ appears in a position where $\phi_2 = 0$ as a line spectrum. In this case, $\Delta\omega_c = 0$.

However, as to $V_B^I$ being an interference component, the size of $\Delta T$ is unknown even in a special case of $\Delta\omega^D = \Delta\omega^U$ and $T_m^D = T_m^U$. Therefore, $V_B^I$ must be calculated also using equation (9) in which contribution from area 501 is also reflected. However, since this is Fresnel integral including $\Delta T$ in its integral range (see FIG. 4), $V_B^I$ appears as a spectrum with an occupied bandwidth that is determined by $\Delta T$, using $\Delta\omega_c$ as its center in the frequency domain. In the present invention, when a received signal includes an interference component, the interference component is chased out of the $V_B^D$ observation band by adjusting $\Delta\omega_c$ and the initial time of modulation input $v_m^D(t)$.

Giving a specific modulation signal and calculating as described above can obtain the quantitative analysis result of the adjustment method of the present invention. However, if $\Delta\omega^D \neq \Delta\omega^U$ or $T_m^D \neq T_m^U$, the relationship between the integrand and integral range complexly varies depending on the value of $\Delta T$. Therefore, it is difficult to build a general analytic expression. However, since the operational principle does not change even under such a condition, as an example, the qualitative nature of the adjustment method of the present invention will be clarified using simulation in the case of $\Delta\omega^D = \Delta\omega^U (=\Delta\omega)$.

Firstly, FIG. 6 shows the relationship between the instantaneous frequency shift and occupied bandwidth of an interference component in the case of $T_m^D = T_m^U (=T_m)$ and $\Delta T = T_m/2$. A solid line 601 and a broken line 602 represent the frequency shifts of the vehicles D and U, respectively, and a one-dotted chain line 603 represents the frequency shift of the interference component (difference between U and D). In this case, the occupied band of the interference component becomes a range $[-2\Delta\omega), 2\Delta\omega]$ and it is found that it covers a band ($4\Delta\omega$) approximately twice as much as the frequency band of the vehicle D.

FIG. 7 shows the spectrum of a base-band signal where the calculation is made by setting $\Delta\omega = 2\pi \times 50$ MHz, $\Delta\omega_c = 2\pi \times 100$ MHz, $T_m = 1$ msec, and SN (signal to noise ratio)=20 dB in each parameter. A spectrum 701 corresponds to the spectrum $V_B^D$ in the case of no interference, and a spectrum 702 corresponds to the spectrum $V_B^I$ of an interference component. Here, an interference component with a very high level mixes into a band in the vicinity of the signal 703 to be detected, of $V_B^D$, and it is found that noise floor rises.

Figure 8:
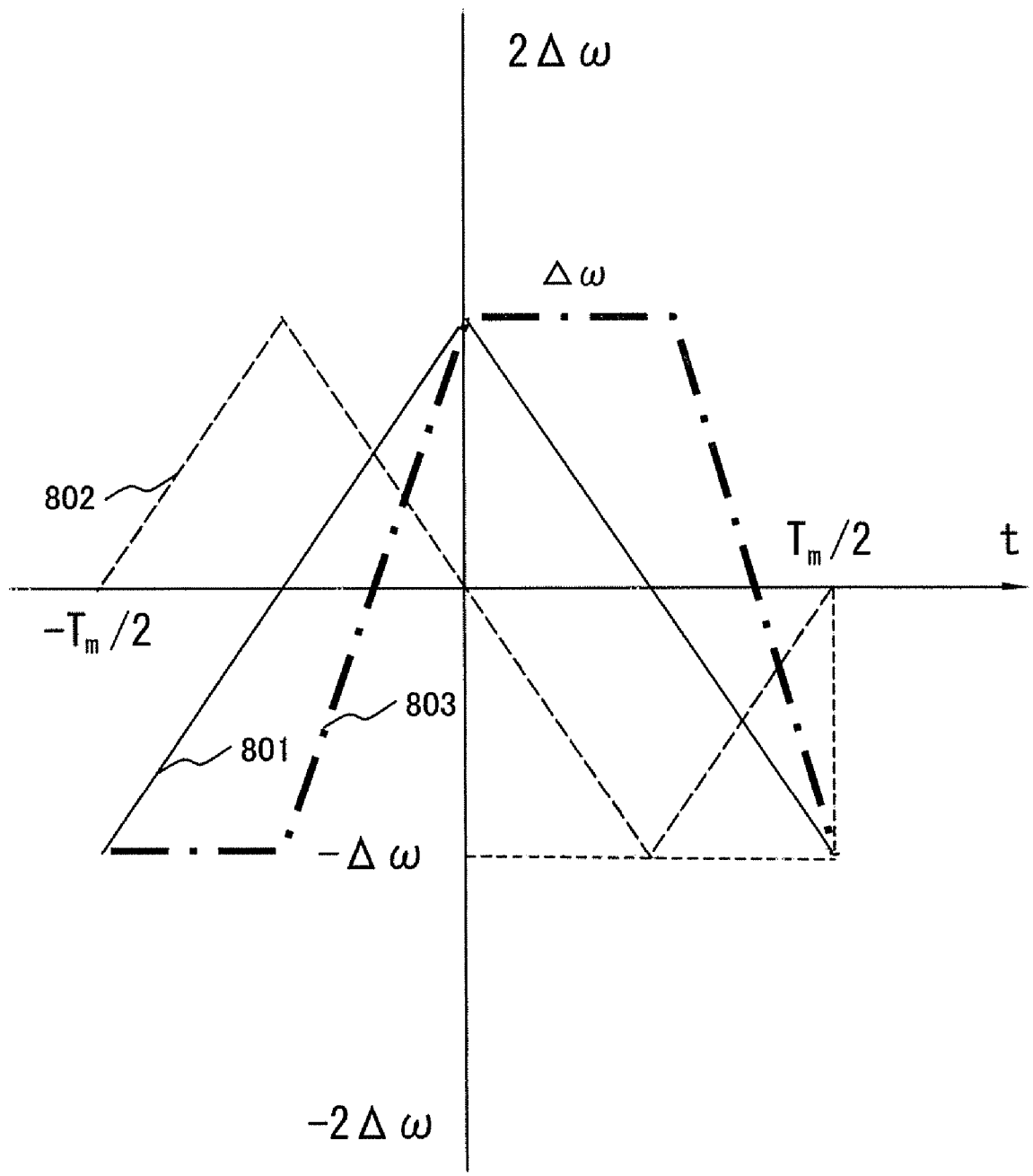
FIG. 8 shows the second frequency shift of the interference component.

Next, FIG. 8 shows the relationship between the instantaneous frequency shift and occupied bandwidth of an interference component in the case of $T_m^D = T_m^U (=T_m)$ and $\Delta T = T_m/4$. A solid line 801 and a broken line 802 represent the frequency shifts of the vehicles D and U, respectively, and a one-dotted chain line 803 represents the frequency shift of the interference component. In this case, the occupied band of the interference component becomes $[-\Delta\omega, \Delta\omega]$. The spectrum derived from each time span of spans $[-T_m/4, 0]$ and $[T_m/4, T_m/2]$ can be given by Fresnel integration and that of spans $[-T_m/2, -T_m/4]$ and $[0, T_m/4]$ can be given by the δ function.

Figure 9:
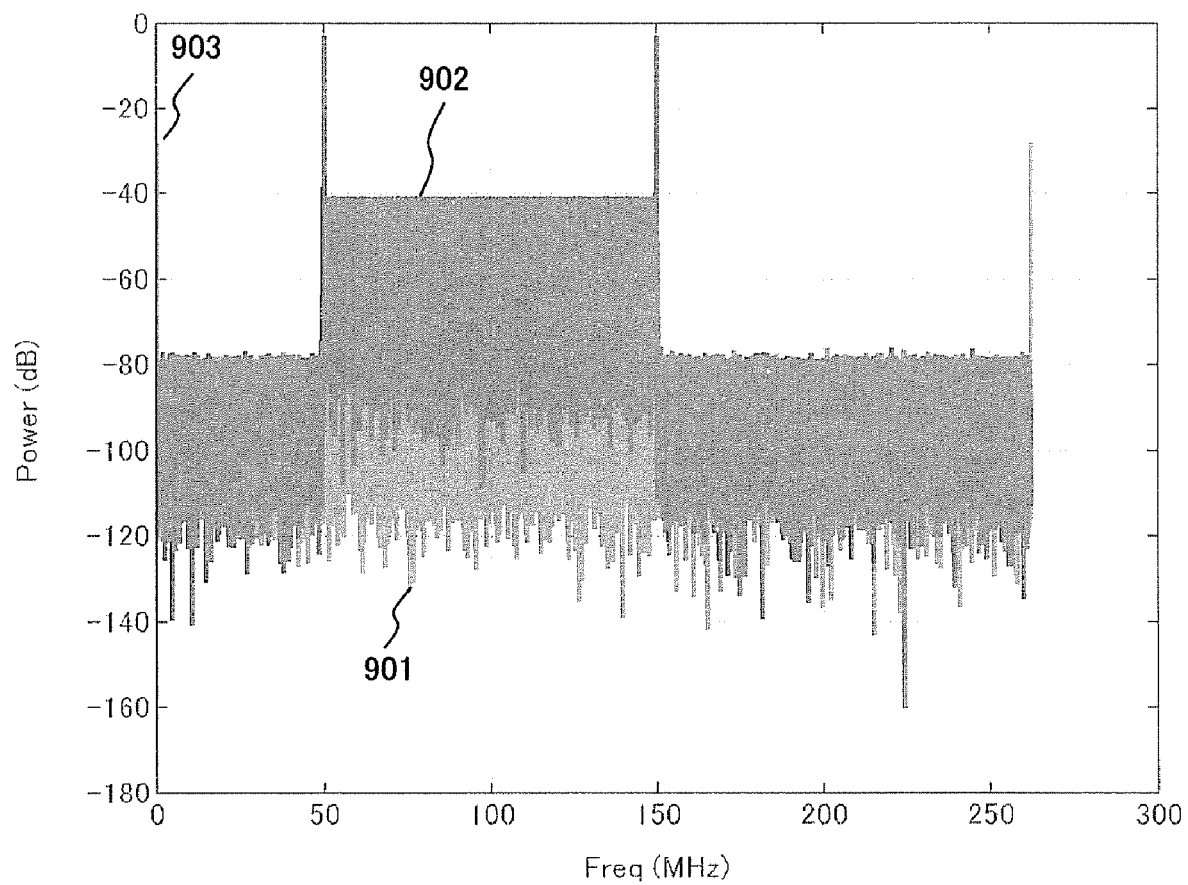
FIG. 9 shows the first adjustment result of the interference component.

FIG. 9 shows the spectrum of a base-band signal in the case where calculation is made by setting the same values as in FIG. 7 in each parameter. A spectrum 901 corresponds to the spectrum $V_B^D$ in the case of no interference, and spectrum 902 corresponds to the spectrum $V_B^I$ of the interference component. Compared with FIG. 7, the band of the spectrum $V_B^I$ narrows and no interference component mixes into the band in the vicinity of a signal 903 to be detected, of $V_B^D$ due to the effect of $\Delta\omega_c$.

If the linearity of the system is good, the simplest implementation method of the present invention is to set $\Delta\omega_c > \Delta\omega^D + \Delta\omega^U$. However, radar equipment used on a vehicle or the like usually has a bandwidth of several hundred MHz, and if many pieces of radar equipment are crowded in a narrow area, it can be anticipated that a sufficiently large $\Delta\omega_c$ cannot be secured. In such a case or if the linearity of the system is bad and a spectrum spreads, it is anticipated that it is difficult to avoid inter-equipment interference within a predetermined band only by a simple implementation method.

Thus, if an interference component with a large level is observed, as shown in FIG. 7, the interference component can be chased out of the observation band by appropriately shifting the initial time of a modulation input $v_m^D(t)$ in the radar equipment of the vehicle D. It can also be chased out on the direct current (DC) side.

Next, an application example in the case of $\Delta\omega^D = \Delta\omega^U = \Delta\omega$ and $T_m^D \neq T_m^U$ is described with reference to FIGS. 10 through 12.

Figure 10:
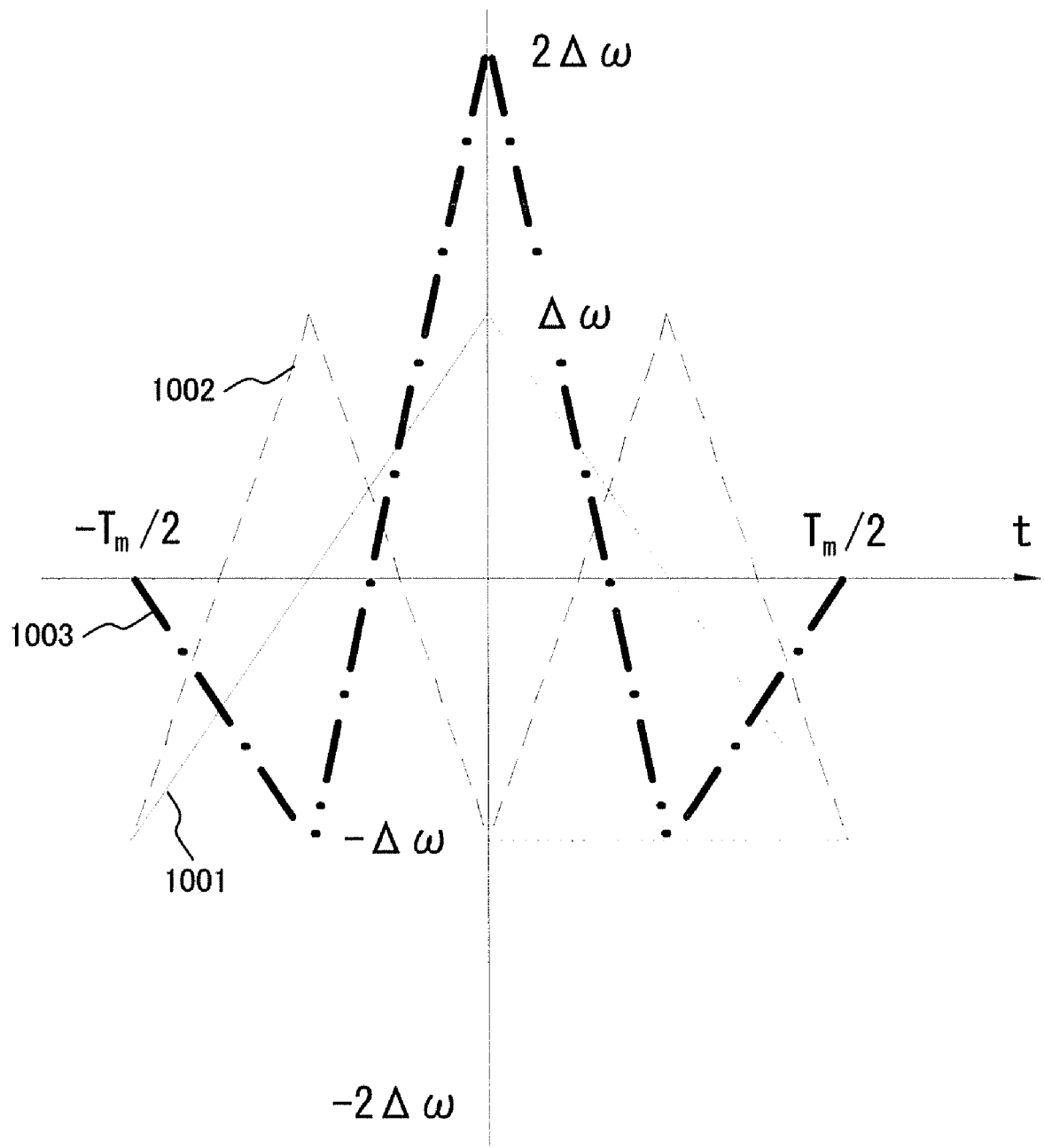
FIG. 10 shows the third frequency shift of the interference component.

FIG. 10 shows the relationship between the instantaneous frequency shift and occupied bandwidth of an interference component in the case of $T_m^D = T_m = 2T_m^U$ and $\Delta T = T_m^U/2$. A solid line 1001 and a broken line 1002 represent the frequency shifts of the vehicles D and U, respectively, and a one-dotted chain line 1003 represents the frequency shift of the interference component. In this case, the occupied band of an interference component becomes $[-\Delta\omega, 2\Delta\omega]$.

Figure 11:
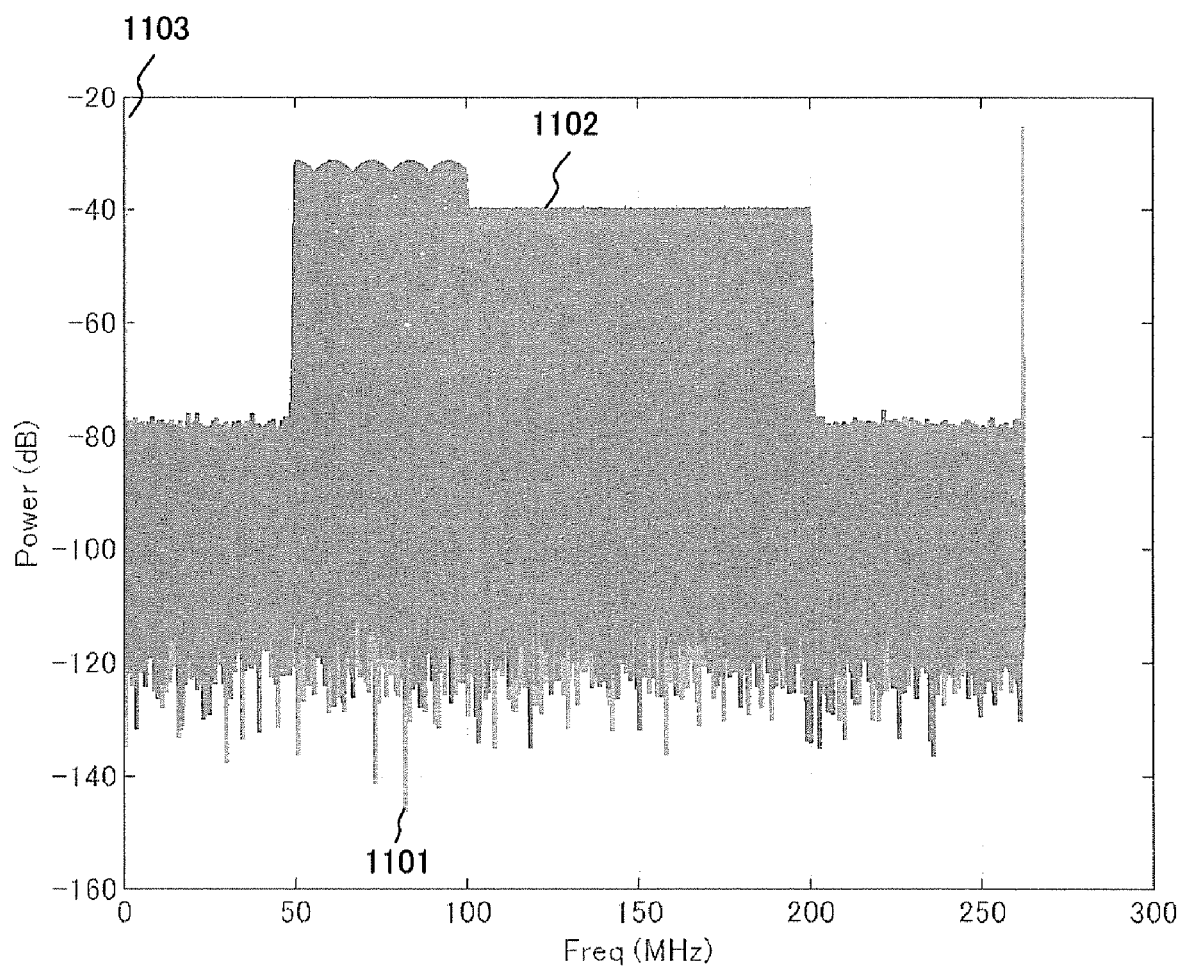
FIG. 11 shows the second adjustment result of the interference component.

FIG. 11 shows the spectrum of a base-band signal where calculation is made by setting the same values as in FIG. 7 in each parameter. A spectrum 1101 corresponds to the spectrum $V_B^D$ in the case of no interference, and spectrum 1102 corresponds to the spectrum $V_B^I$ of the interference component. Compared with FIG. 7, it is found that the band of the spectrum $V_B^I$ narrows and no interference component mixes into the band in the vicinity of a signal 1103 to be detected, of $V_B^D$.

Figure 12:
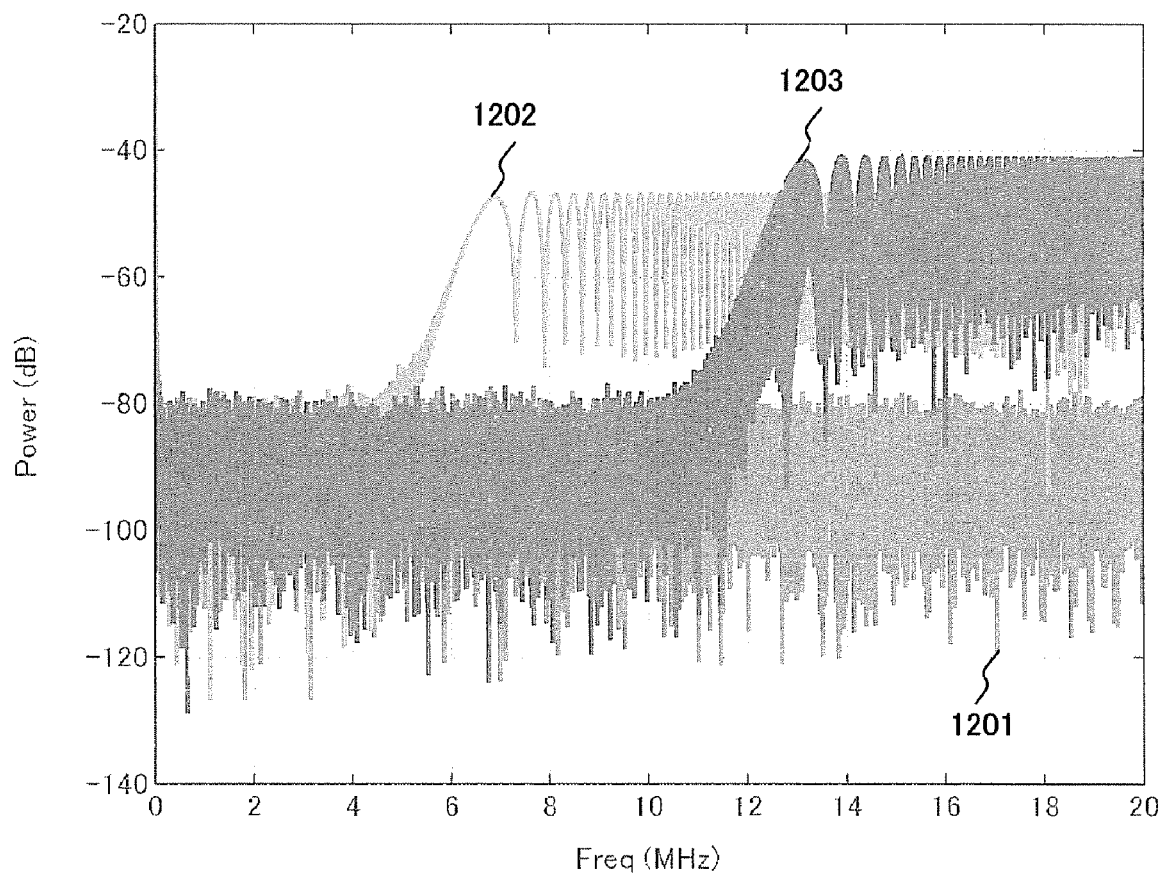
FIG. 12 shows the third adjustment result of the interference component.

FIG. 12 shows the spectrum of a base-band signal where $T_m^D=T_m=8T_m^U$ is set and the calculation is made by setting the same values as in FIG. 7 in each parameter. A spectrum 1201 corresponds to the spectrum $V_B^D$ in the case of no interference, and spectra 1202 and 1203 correspond to the spectrum $V_B^I$ of the interference component in the case of $\Delta T=T_m^U/4$ and $\Delta T=T_m^U/2$, respectively. It is found that the band of the spectrum $V_B^I$ of an interference component is moved by changing the value of $\Delta T$.

Next, the configuration and operation of the search/detection apparatus provided with such an adjustment method is described in detail with reference to FIGS. 13 through 24.

Figure 13:
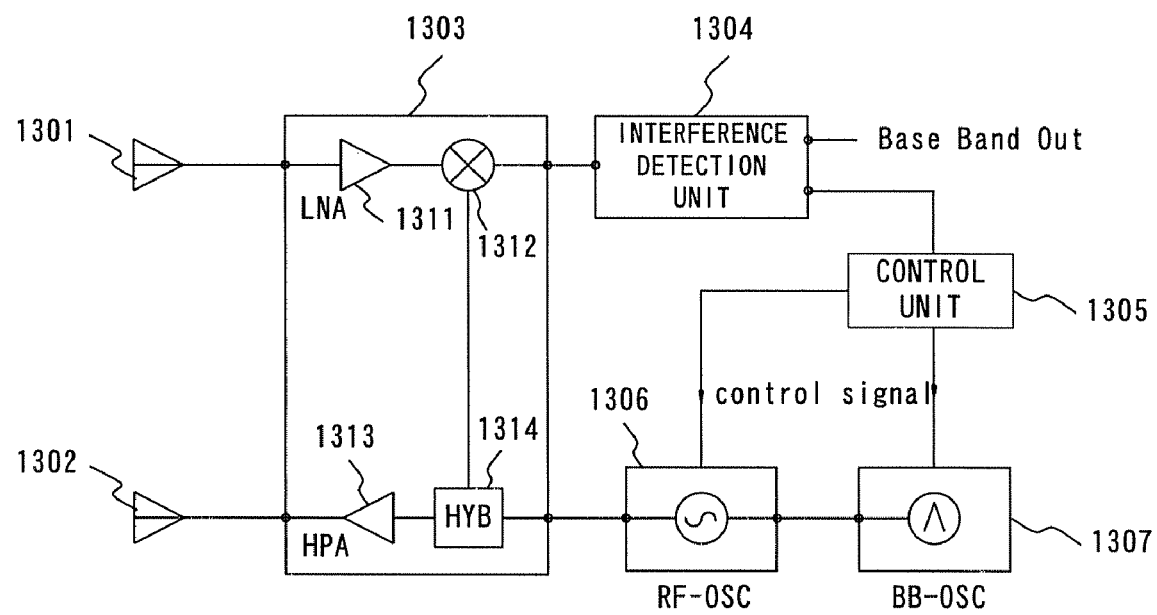
FIG. 13 shows the first FMCW radar equipment.

FIG. 13 shows an example of the configuration of vehicle-mounted FMCW radar equipment provided with an interference detection unit. The FMCW radar equipment shown in FIG. 13 comprises a receiving antenna 1301, a transmitting antenna 1302, a transmitter-receiver unit 1303, an interference detection unit 1304, a control unit 1305, a radio frequency oscillator 1306, and a base-band oscillator 1307. The transmitter-receiver 1303 comprises a low-noise amplifier 1311, a mixer 1312, a high-power amplifier 1313, and a branch unit (HYB) 1314. The control unit 1305 comprises, for example, a central processing unit (CPU) and a memory.

The base-band oscillator 1307 is a function generator or the like. The base-band oscillator 1307 generates a triangle wave and outputs it to the radio frequency oscillator 1306. The radio frequency oscillator 1306 is a voltage-controlled oscillator (VOC) for example. The radio frequency oscillator 1306 generates a transmitting signal frequency-modulated by the triangle wave and outputs it to the transmitter-receiver unit 1303.

The branch unit 1314 of the transmitter-receiver unit 1303 outputs the transmitting signal to the high-power amplifier 1313 and the mixer 1312. The high-power amplifier 1313 amplifies the transmitting signal and outputs it to the transmitting antenna 1302. A signal transmitted from the transmitting antenna 1302 is reflected on another target vehicle, and is received by the receiving antenna 1301. The low-noise amplifier 1311 amplifies the received signal. The mixer 1312 generates a beat signal by mixing the received signal with a part of the transmitting signal.

The interference detection unit 1304 comprises, for example, an intermediate frequency amplifier and a low-pass filter like the amplifier 33 shown in FIG. 1, and generates a base-band signal from the beat signal. This base-band signal is transferred to a fast Fourier transformation unit at the later stage, which is not shown in FIG. 13. Information about a distance r up to the target, relative velocity v, and the like is extracted from the base-band signal.

Then, the interference detection unit 1304 monitors the power level of the base-band signal and determines the existence/non-existence of interference signal. The interference detection unit 1304 then outputs a detection signal for indicating the existence of an interference signal to the control unit 1305. The existence/non-existence of an interference signal can be determined, for example, by comparing the maximum value of the power level of the base-band signal with a predetermined threshold value. If an interference component with a high level mixes into the observation band, the component is detected as the rise of the noise floor as shown in FIG. 7 or a peak in the base-band signal. It means that the maximum value of the power level exceeds the threshold value.

When receiving the detection signal from the interference detection unit 1304, the control unit 1305 outputs a control signal to the radio frequency oscillator 1306 and/or the base-band oscillator 1307 to modify the carrier frequency of the radio frequency oscillator 1306 and/or the initial time of the modulation signal of the base-band oscillator 1307. Alternatively, the control unit 1305 can modify the cycle $T_m$ of the modulation signal of the base-band oscillator 1307.

If the carrier frequency is modified, $\Delta\omega_c$ which is the offset of the radio frequency oscillator 1306 against an interference signal changes. If the initial time of the modulation signal is modified, the difference $\Delta T$ in initial time between the modulation signal of the base-band oscillator 1307 and the modulation signal of the interference source changes. Thus, the interference component can be chased out of the observation band while maintaining the peak of a spectrum corresponding to a detection target at the same position of the frequency domain.

FIG. 14 shows another configuration example of the FMCW radar equipment provided with an interference detection unit. The configuration of the FMCW radar equipment shown in FIG. 14 can be obtained by adding a variable delay 1401 to the configuration shown in FIG. 13.

When receiving a detection signal from the interference detection unit 1304, the control unit 1305 outputs a control signal to the radio frequency oscillator 1306 and/or the variable delay 1401 to modify the carrier frequency of the radio frequency oscillator 1306 and/or the amount of delay of the variable delay 1401. By modifying the amount of delay of the variable delay 1401, the difference $\Delta T$ in initial time between the modulation signal of the base-band oscillator 1307 and the modulation signal of the interference source changes.

The modulation signal phase can also directly be modified using a variable phase shifter instead of the variable delay 1401.

Figure 15:
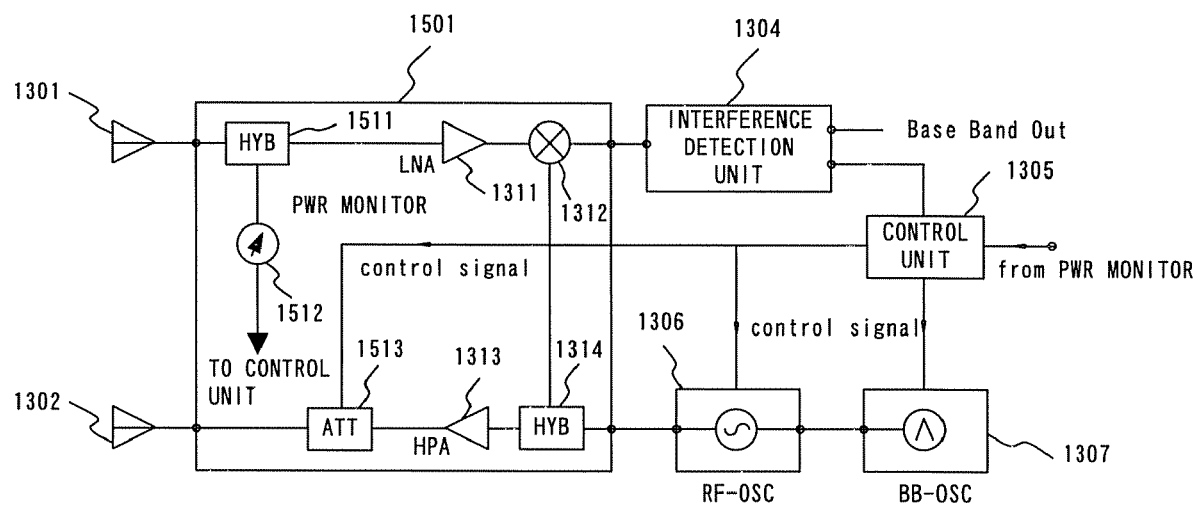
FIG. 15 shows the third FMCW radar equipment.

FIG. 15 shows an example of the configuration of FMCW radar equipment provided with a power monitor as well as the interference detection unit. The configuration of the FMCW radar equipment shown in FIG. 15 can be obtained by replacing the transmitter-receiver unit 1303 with a transmitter-receiver unit 1501 in the configuration shown in FIG. 13. The configuration the transmitter-receiver unit 1501 can be obtained by adding a branch unit 1511, a power monitor 1512, and an attenuator (ATT) 1513 to the configuration of the transmitter-receiver unit 1303.

The branch unit 1511 outputs a received signal from the receiving antenna 1301 to the low-noise amplifier 1311 and a power monitor 1512. The power monitor 1512 monitors receiving power in the carrier frequency band and outputs a monitor signal for indicating the receiving power to the control unit 1305. The attenuator 1513 attenuates a transmitting signal from the high-power amplifier 1313 and outputs it to the transmitting antenna 1302.

The control unit 1305 receives the monitor signal from the power monitor 1512. When excessive receiving power derived from an interference signal is observed, the control unit 1305 outputs a control signal to the attenuator 1513 to reduce the radiation level of the transmitting signal. Thus, by controlling the radiation level of a transmitting signal according to the receiving power, the existence of an interference signal can be checked.

For example, when the receiving power exceeds the predetermined threshold value, the control unit 1305 determines that excessive receiving power is observed and outputs a control signal for reducing the radiation level of the transmitting signal. If the detection signal from the interference detection unit 1304 is not interrupted, the control unit 1305 determines that an interference signal certainly exists and exercises the control shown in FIG. 13 over the radio frequency oscillator 1306 and/or the base-band oscillator 1307.

If the detection signal from the interference detection unit 1304 is interrupted, the control unit 1305 determines that a signal detected by the interference detection unit 1304 is not an interference signal but an echo signal, and exercises no control over the radio frequency oscillator 1306 and/or the base-band oscillator 1307.

Then, the control unit 1305 restores the transmitting signal's radiation level to its original level and restores the transmitter-receiver unit 1501 to its normal operation. By performing such control, an interference component can be effectively chased out of the observation band while avoiding the bad influence on the receiving system of excessive input.

The transmitting signal can also be stopped by providing a switch instead of the attenuator 1513 and switching it off.

The reduction ratio of interference power to a frequency can also be measured using a monitor signal from the power monitor. The respective parameters of the radio frequency oscillator 1306 and/or the base-band oscillator 1307 can be changed sequentially. The control unit 1305 measures the reduction ratio of the interference power by storing receiving power at a time t in a memory and comparing these values at specific time intervals. Alternatively, the interference power's reduction ratio can be measured by receiving the respective power levels of the base-band signals before and after the transmitting signal's radiation level reduction from the interference detection unit 1304.

Although in FIGS. 13 through 15, the interference detection unit 1304 is provided after the mixer 1312, it can also be provided in an arbitrary position of the receiving system's signal route. For example, if the interference detection unit 1304 is provided between the receiving antenna 1301 and the low-noise amplifier 1311, an interference signal can be detected in the radio frequency band. The interference detection unit 1304 can also be provided after the fast Fourier transformation unit, which is not shown in FIGS. 13-15.

If Doppler frequency shift $\omega_d$ and the non-linear effect of the system are taken into consideration, no interference component mixes when relationship $\Delta\omega_c > \Delta\omega^D + \Delta\omega^U$ is satisfied. Therefore, it is also effective to change a carrier frequency at random by a frequency hopping sequence. The same fact also applies to the parameters (initial time, phase and cycle $T_m^D$) of a modulation signal and a modulation bandwidth $\Delta\omega^D$.

By hopping a carrier frequency, the parameters of a modulation signal and the like according to an appropriate random sequence, the control unit 1305 reduces the probability of interference occurrence. Several parameters can also be combined to be uniquely encoded and stored in a memory, and one set of the combinations can also be selected for control. If a sufficient observation time can be secured, such as when radar equipment is operated on the premises, the combination sequence of parameters can also be updated using a neutral network, a genetic algorithm, or the like.

Figure 16:
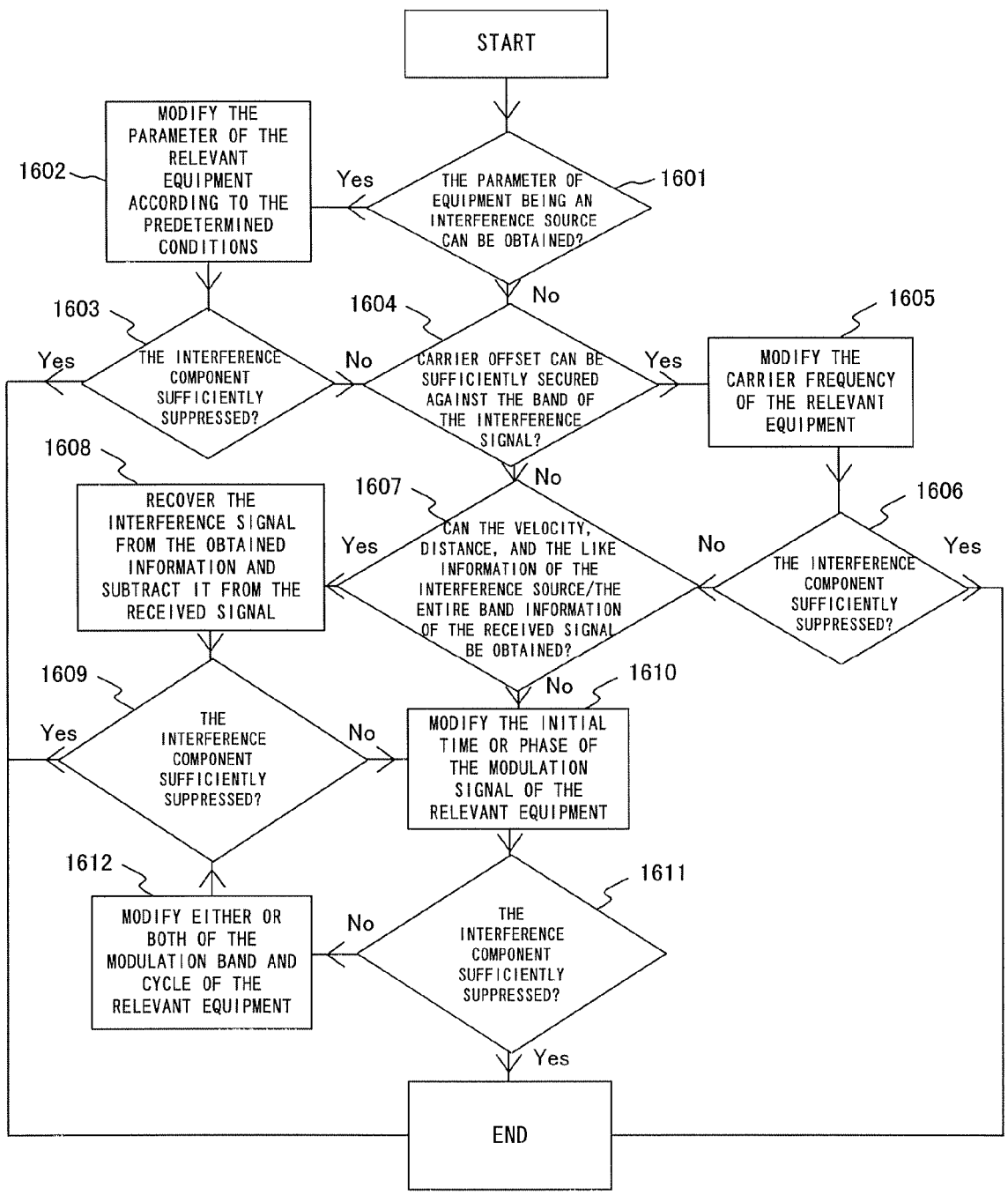
FIG. 16 is the flowchart of a parameter modification process.
Figure 18:
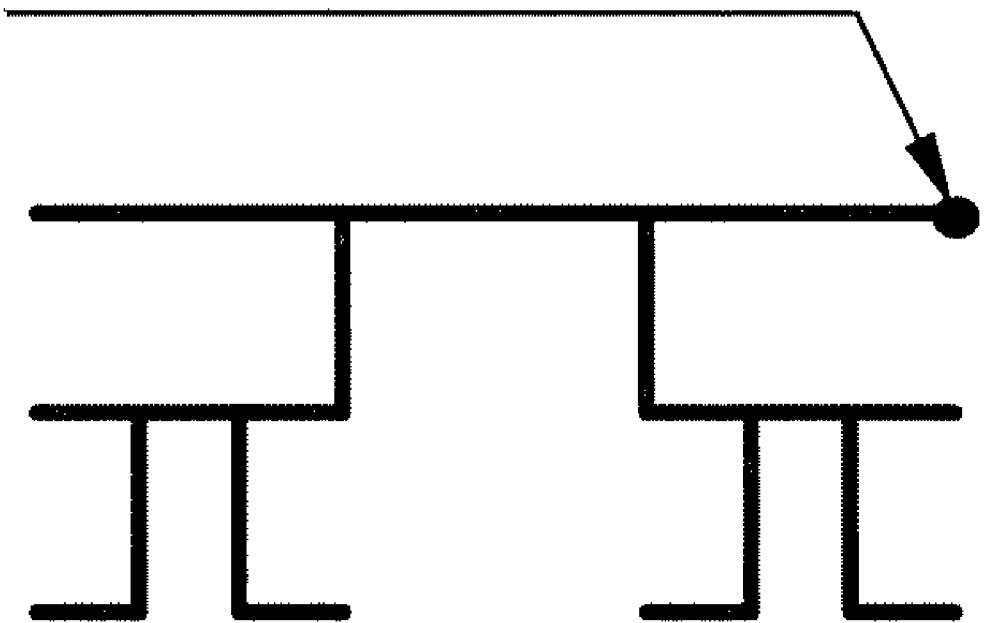
FIG. 18 shows the second fractal structure.
Figure 19:
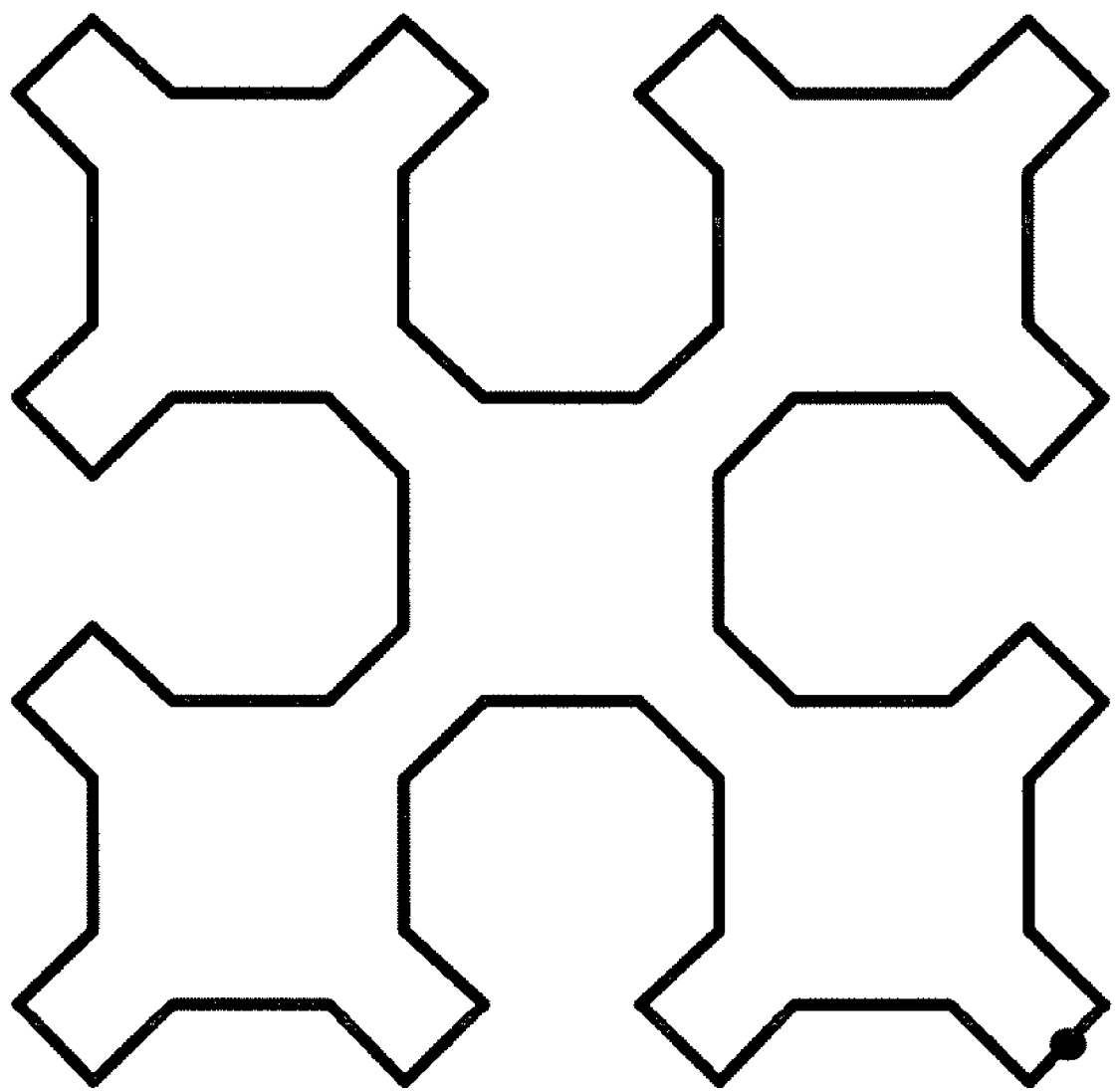
FIG. 19 shows the third fractal structure.
Figure 20:
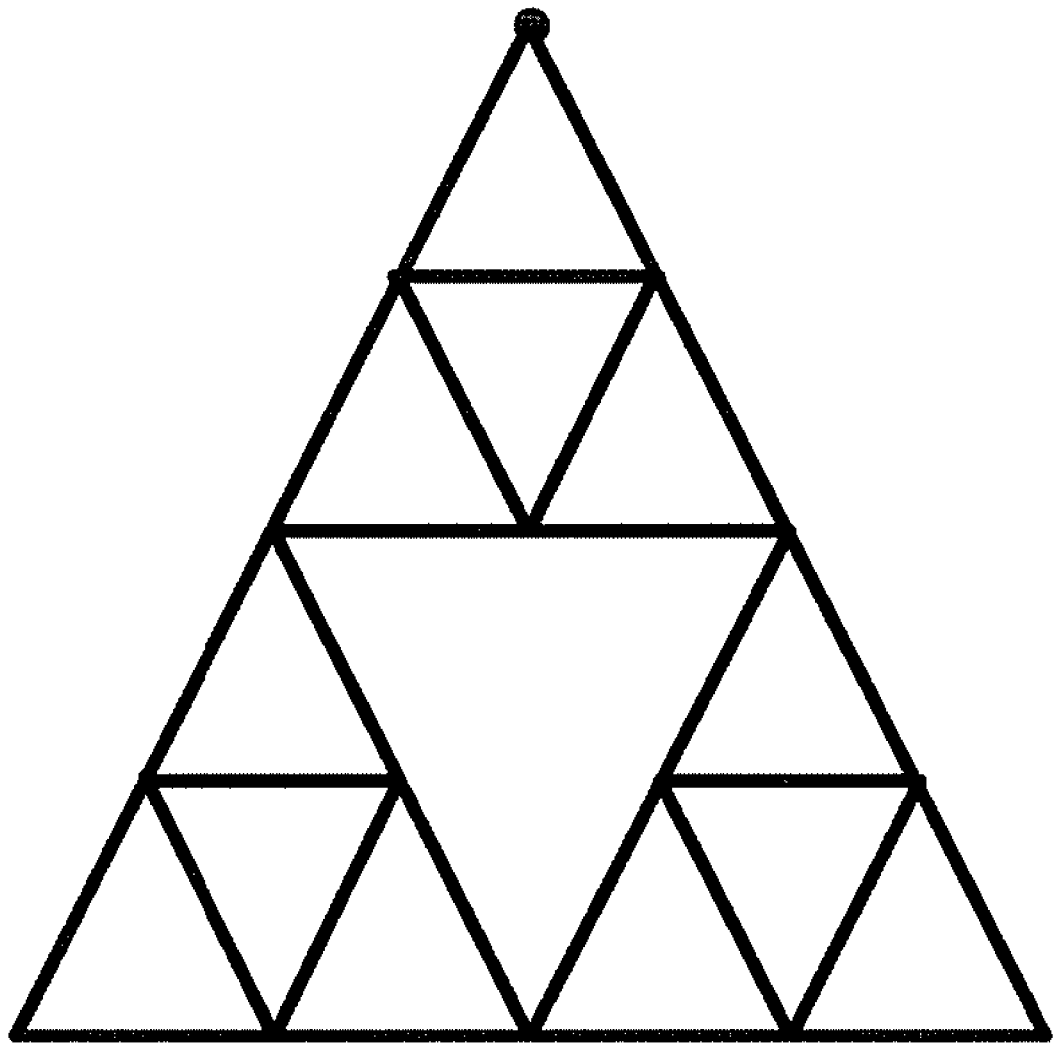
FIG. 20 shows the fourth fractal structure.

FIG. 16 is the flowchart of a parameter modification process of cooperatively changing parameters in one configuration shown in FIGS. 13-15. The control unit 1305, first checks whether the parameter of equipment as an interference source can be obtained (step 1601).

The interference source equipment is an FMCW radar equipment mounted on another vehicle or the like. Information about the parameter can be obtained via a radar signal by a method described later. Alternatively, it can be obtained using infrastructure, such as an ordinary inter-vehicle communication, a road repeater/control center, or the like.

If the parameter of the interference source can be obtained, the parameter of the relevant equipment is modified according to the predetermined conditions, using the obtained parameter of the interference source (step 1602). In this case, for example, the carrier frequency or modulation bandwidth of the relevant equipment is modified in such a way that relationship $\Delta\omega_c > \Delta\omega^D + \Delta\omega^U$ may hold true.

Then, it is checked whether an interference component can be sufficiently suppressed (step 1603). If the output of a detection signal from the interference detection unit 1304 is stopped, it is determined that the interference component can be sufficiently suppressed and the process is terminated.

If in step 1601 the parameter of the interference source could not be obtained or if in step 1603 the interference component could not be sufficiently suppressed, it is checked whether the offset of a carrier frequency against the band of the interference signal can be sufficiently secured (step 1604).

If the offset of a carrier frequency against the band of the interference signal can be sufficiently secured, the carrier frequency of the relevant equipment is modified (step 1605) and it is checked whether the interference component has been sufficiently suppressed (step 1606). If the interference component has been sufficiently suppressed, the process is terminated.

If in step 1604 the offset of a carrier frequency cannot be sufficiently secured or if in step 1606 the interference component cannot be sufficiently suppressed, it is checked whether information about the velocity, distance, and the like of the interference source, and information about the entire band of a received signal can be obtained (step 1607).

If such information can be obtained, the interference signal is recovered and is subtracted from the received signal (step 1608). Then it is checked if the interference component has been sufficiently suppressed (step 1609). If the interference component has been sufficiently suppressed, the process is terminated.

If, in step 1607, information about the velocity, distance, and the like of the interference source and information about the entire band range of a receiving signal cannot be obtained or if in step 1609 the interference component cannot be sufficiently suppressed, the initial time or phase of the relevant equipment's modulation signal is modified (step 1610), and it is checked whether the interference component has been sufficiently suppressed (step 1611). If the interference component has been sufficiently suppressed, the process is terminated. If, in step 1611, the interference component cannot be sufficiently suppressed, the modulation bandwidth of the relevant equipment and/or the cycle of the modulation signal are modified (step 1612), and it is checked whether the interference component has been sufficiently suppressed (step 1609). If the interference component has been sufficiently suppressed, the process is terminated. If in step 1609 the interference component cannot be sufficiently suppressed, the process in step 1610 is repeated for readjustment.

In a series of processes in steps 1609, 1610, 1611, and 1612, the processes in steps 1610 and 1612 can be individually performed as in FIG. 16. Alternatively, a plurality of parameters can be simultaneously modified, for example, using the power of the interference component or the like as a measure and using an algorithm, such as the least-squares method.

Next, a method for transmitting parameter information between two pieces of FMCW radar equipment by including information about each parameter in a radar signal is described. The parameter information can be carried on either a modulation signal or a carrier signal. By exchanging such parameter information, interference between the two pieces of FMCW radar equipment provided with the same adjustment method can become easily identified and response can be improved.

For example, a sub-channel is provided out of the band of a probe signal and the sub-channel can transmit the parameter information. If this sub-channel is set in the operational band of the transmitter-receiver unit, two channels can share the antenna of the FMCW radar equipment. Alternatively, by making the antenna structure fractal and adding a branch unit and a sub-channel transmitter-receiver unit, the sub-channel can be set in a band with another carrier frequency as its center.

FIGS. 17 through 20 show examples of the antenna with fractal structure. The antenna shown in FIG. 17 has binary-tree fractal structure and the antenna shown in FIG. 18 has Cantor-bars fractal structure. The antenna shown in FIG. 19 has Sierpinski-curve fractal structure and the antenna shown in FIG. 20 has Sierpinski-gasket fractal structure.

According to such structure, by branching input/output from an appropriate feeding point, an antenna with a resonance point in a plurality of frequencies can be realized. With an appropriate design, an antenna with high efficiency in a fairly narrow area can be realized. The shape of an element antenna is not specified. It can be in a line shape, a patch shape or a slot shape. More particularly, in FIGS. 19 and 20, an area enclosed by a curve can form a patch or slot antenna.

Figure 21:
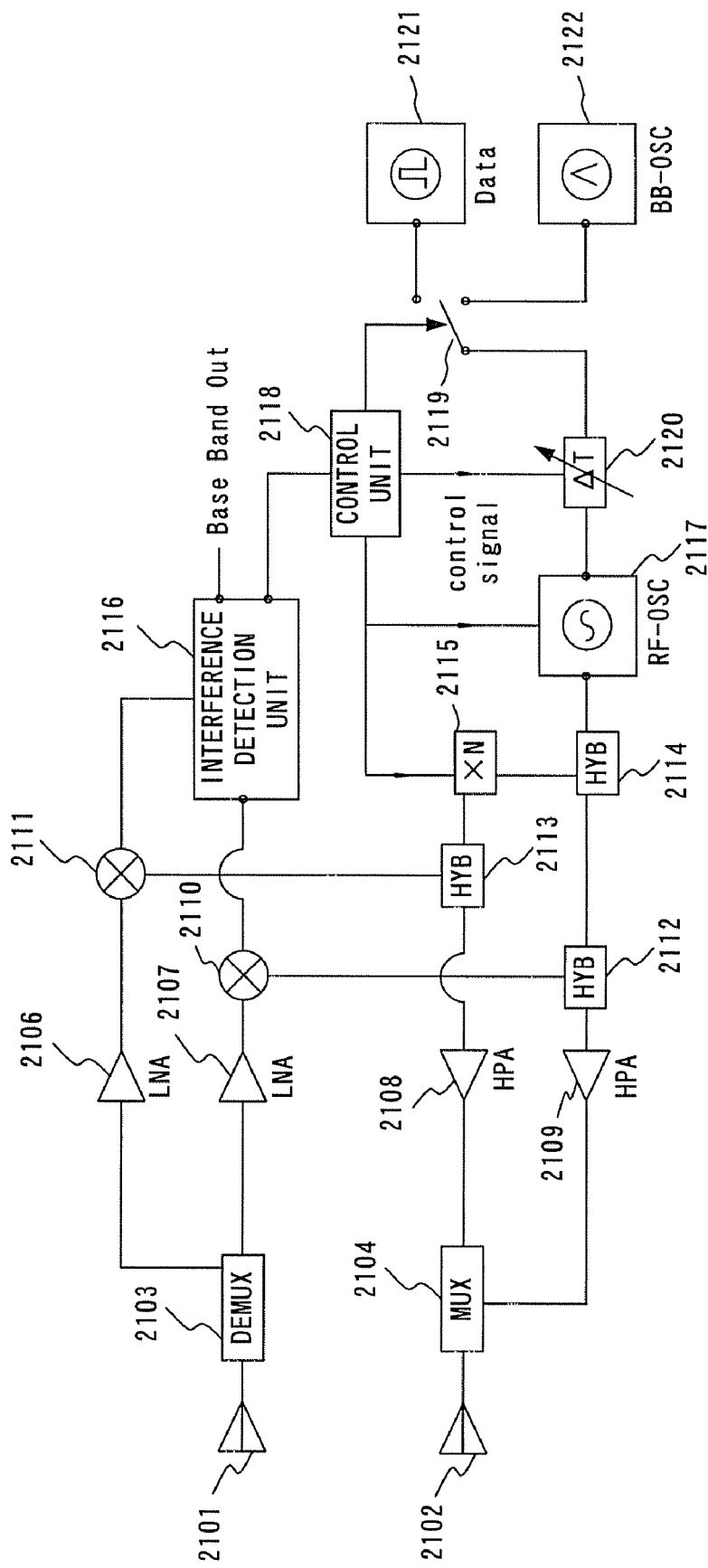
FIG. 21 shows the fourth FMCW radar equipment.

FIG. 21 shows an example of the configuration of FMCW radar equipment using a fractal-structured antenna. The FMCW radar equipment shown in FIG. 21 comprises a receiving antenna 2101, a transmitting antenna 2102, a demultiplexer (DEMUX) 2103, a multiplexer (MUX) 2104, a switch 2119, low-noise amplifiers 2106 and 2107, high-power amplifiers 2108 and 2109, mixers 2110 and 2111, branch units (HYB) 2112, 2113 and 2114, a frequency multiplier 2115, an interference detection unit 2116, a radio frequency oscillator 2117, a control unit 2118, a variable delay 2120, a data generator 2121, and a base-band oscillator 2122.

Each of the receiving antenna 2101 and the transmitting antenna 2102 has the above-described fractal structure and has a resonance point in a plurality of frequencies. The control unit 2118 comprises, for example, a CPU and a memory. The operations of the interference detection unit 2116, radio frequency oscillator 2117, variable delay 2120, and base-band oscillator 2122 are the same as the interference detection unit 1304, radio frequency oscillator 1306, variable delay 1401, and base-band oscillator 1307, respectively, shown in FIG. 14.

The data generator 2121 generates a data signal including the parameter information about the relevant equipment. The control unit 2118 inputs the output signal of either the data generator 2121 or the base-band oscillator 2122 to the radio frequency oscillator 2117 as a modulation signal by switching the switch 2119. Since the data generator 2121 and the base-band oscillator 2122 share the radio frequency oscillator 2117 with each other, the modulation method of a probe signal becomes stepped frequency modulation and the modulation method of a data signal becomes ASK (PSK) or the like.

The high-power amplifier 2109 and the branch units 2112 and 2114 constitute the transmitting unit of a main channel, and the high-power amplifier 2108, the branch unit 2113 and the frequency multiplier 2115 constitute the transmitting unit of a sub-channel. The frequency multiplier 2115 multiplies the frequency of the output signal of the radio frequency oscillator 2117 by N times, based on a control signal from the control unit 2118 and outputs it. The multiplexer 2104 multiplexes the respective transmitting signals of the main and sub channels and outputs them to the transmitting antenna 2102.

The low-noise amplifier 2107 and the mixer 2110 constitute the receiving unit of the main channel, and the low-noise amplifier 2106 and the mixer 2111 constitute the receiving unit of the sub-channel. The demultiplexer 2103 demultiplexes and outputs the respective received signals of the main and sub channels.

The interference detection unit 2116 generates a base-band signal, using a beat signal outputted from the receiving unit of the main or sub channel, and detects an interference signal. Then, the interference detection unit 2116 extracts the parameter information of another piece of equipment from the base-band signal of the sub-channel and outputs it to the control unit 2118. The control unit 2118 modifies the parameter of the relevant equipment in such a way as to suppress an interference component, using the received parameter information.

A frequency divider can also be used instead of the frequency multiplier 2115. If time division is completely performed, a branch unit or a switch unit can also be used instead of the demultiplexer 2103 and the multiplexer 2104. However, a required matching circuit must be included between the receiving antenna 2101 and the low-noise amplifiers 2106 and 2107, and between the transmitting antenna 2102 and the high-power amplifiers 2108 and 2109.

Figure 22:
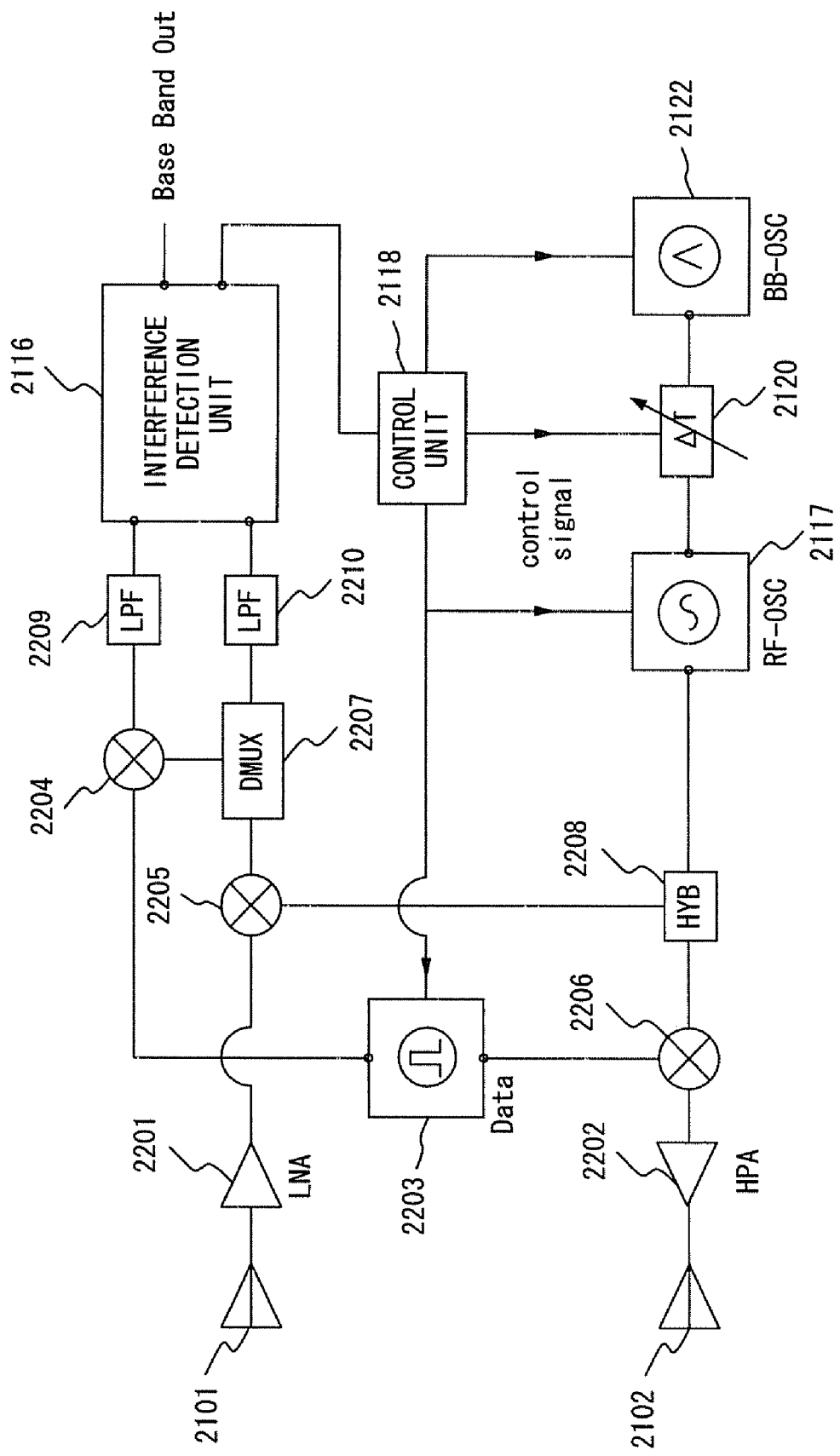
FIG. 22 shows the fifth FMCW radar equipment.

FIG. 22 shows a configuration example of another piece of FMCW radar equipment using a fractal-structured antenna. The FMCW radar equipment shown in FIG. 22 comprises a receiving antenna 2101, a transmitting antenna 2102, a low-noise amplifier 2201, a high-power amplifier 2202, a data generator 2203, mixers 2204, 2205, and 2206, a demultiplexer 2207, a branch unit 2208, low-pass filters (LPF) 2209 and 2210, an interference detection unit 2116, a radio frequency oscillator 2117, a control unit 2118, a variable delay 2120, and a base-band oscillator 2122.

The respective operations of the receiving antenna 2101, transmitting antenna 2102, interference detection unit 2116, radio frequency oscillator 2117, variable delay 2120, and base-band oscillator 2122 are the same as those shown in FIG. 21.

The data generator 2203 outputs a data signal to the mixers 2204 and 2206, based on a control signal from the control unit 2118. The mixer 2206 generates a transmitting signal by mixing the output signal of the radio frequency oscillator 2117 with the data signal, and outputs it to the high-power amplifier 2202.

The mixer 2205 generates a beat signal by mixing a received signal from the low-noise amplifier with a part of the output signal of the radio frequency oscillator 2117. The demultiplexer 2207 demultiplexes the beat signal into two signals and outputs them to the mixer 2204 and the low-pass filter 2210. The mixer 2204 mixes the output signal of the demultiplexer 2207 with the data signal, and outputs it to the low-pass filter 2209.

According to the configuration shown in FIG. 21 or 22, the parameter of the FMCW radar equipment can be superimposed and transmitted on a probe signal as a second modulation signal. By extracting the parameter of another piece of FMCW radar equipment when a signal received from the equipment is demodulated, as shown in FIG. 16, an interference signal from the other FMCW radar equipment can be easily discriminated and the parameter of the relevant equipment can be easily modified.

Next, a method for selecting a parameter to set based on a highly unique fixed number is described. In this method, a plurality of parameter combinations are stored in a memory in advance. When an interference signal is detected, one set of them is selected and the parameters of the set are used as parameters after modification.

Figure 23:
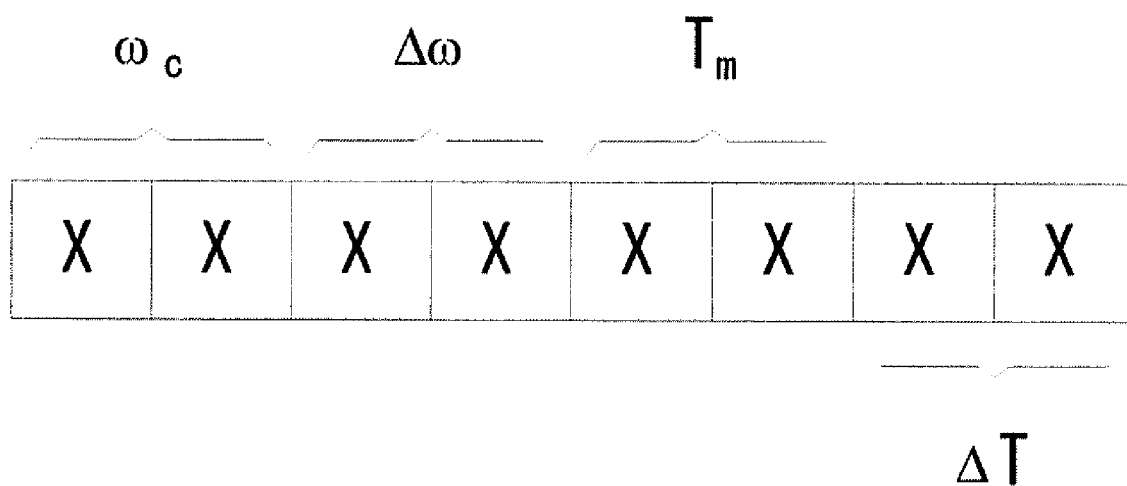
FIG. 23 shows the first fixed number.

FIG. 23 shows a method for selecting parameters using the phone number of a cellular phone possessed by a driver or the like. In this example, the last eight digits of a phone number is divided into four groups of two digits. A carrier frequency, a modulation bandwidth, a cycle of a modulation signal, and a initial time (phase) of the modulation signal are assigned to each of the groups. Two digits of the identification number are also assigned in advance to each parameter stored in the memory. Then, the FMCW radar equipment of each vehicle which has detected an interference signal modifies the four parameter values into the combination corresponding to the phone number of the driver or the like.

Since the modulation bandwidth and the cycle of a modulation signal are directly connected with the resolution of the FMCW radar or the like, one digit can be also used for the identification.

Figure 24:
FIG. 24 shows the second fixed number.

FIG. 24 shows a method for selecting parameters, using a phone number and location information. In this method, as shown in FIG. 23, each parameter is assigned in advance to a phone number, and also the combination of parameters is dynamically modified according to the location information of the relevant equipment (vehicle) at an appropriate time, which is obtained by a global positioning system (GPS) or the like.

More specifically, the Logical product (AND) of the end eight digits of a phone number and eight digits indicating location information is calculated, and a combination of parameters is selected based on the obtained eight digits of identification number.

According to the parameter selection method shown in FIG. 23 or 24, since the FMCW radar equipment of each vehicle selects a parameter, based on a highly unique fixed number, the probability of interference occurrence between vehicles can be reduced. Instead of the phone number of a cellular phone, a number obtained by encoding personal identification information, such as the fingerprint of a driver, a vehicle number, the radio frequency identification (RFID) number of a starter key, or the like can also be used.

In the preferred embodiment described above, although FMCW radar equipment is used, another piece of radar equipment, such as mono-pulse radar equipment or array radar equipment, sonar equipment or the like can also be used as the search/detection apparatus. For example, if sonar equipment is used as the search/detection apparatus, the antenna and the radio frequency oscillator are replaced with an acoustic wave sensor (piezo-electric device) for transmitting/receiving acoustic waves and a sonar oscillator, respectively.

As the modulation method of a transmitting signal, another method, such as phase modulation, amplitude modulation, code modulation, or the like can also be used besides frequency modulation. In this case, a modulation method can also be cooperatively modified in addition to the parameter modification process shown in FIG. 16.

Furthermore, the usage of the search/detection apparatus is not limited to an automobile. The search/detection apparatus can also be mounted and used on another moving object, such as an airplane, a vessel, or the like. In this case, a probe signal is radiated from a sensor, such as an antenna or the like, to a medium (the air, water, or etc.) in which a target exists.

What is claimed is:

1. A search/detection apparatus, comprising:
   a generation device for modulating a carrier signal by a modulation signal and generating a probe signal for detecting location of a target;
   a transmitting sensor for radiating the probe signal;
   a receiving sensor for receiving the probe signal reflected by the target as an echo signal;
   an extraction device for extracting distance information about the target from the echo signal;
   an interference detection device for detecting existence of an interference signal other than the echo signal from a signal received by the receiving sensor and outputting a detection signal; and
   a control device for modifying a parameter of the modulation signal when receiving the detection signal from the interference detection device.

2. The search/detection apparatus according to claim 1, wherein
   the control device modifies at least one of an initial time, a phase, and a cycle of the modulation signal as the parameter of the modulation signal.

3. The search/detection apparatus according to claim 1, wherein
   when receiving the detection signal, the control device further modifies a parameter of the carrier signal.

4. The search/detection apparatus according to claim 3, wherein
   the control device modifies at least one of a center frequency and a modulation bandwidth of the carrier signal as the parameter of the carrier signal.

5. The search/detection apparatus according to claim 1, wherein
   the control device further modifies a modulation method of the carrier signal when receiving the detection signal.

6. The search/detection apparatus according to claim 1, wherein
   the receiving sensor receives a signal including parameter information of another search/detection apparatus which is an interference source,
   the extraction device extracts the parameter information from the received signal, and
   the control device modifies the parameter of the modulation signal in such a way as to suppress interference, using the extracted parameter information.

7. The search/detection apparatus according to claim 6, wherein
   the receiving sensor receives the signal including the parameter information via a sub-channel provided out of a band of a probe signal of the other search/detection apparatus.

8. The search/detection apparatus according to claim 1, further comprising:
   a power monitor device for monitoring receiving power of the signal received by the receiving sensor and outputting the receiving power to the control device, and
   a reduction device for reducing a radiation level of the probe signal, wherein
   when the power monitor device observes excessive receiving power, the control device controls the reduction device to reduce the radiation level of the probe signal, and if the detection signal from the interference detection device is not interrupted, the control device modifies the parameter of the modulation signal.

9. The search/detection apparatus according to claim 8, wherein
the control device measures a reduction ratio of interference power, based on the receiving power observed by the power monitor device and changes the parameter of the modulation signal sequentially.

10. The search/detection apparatus according to claim 1, wherein
the control device changes the parameter of the modulation signal at random according to a hopping sequence.

11. The search/detection apparatus according to claim 1, wherein
the control device maintains a plurality of combinations of parameters of the modulation signal, selects one of the plurality of combinations, based on a predetermined fixed number and uses the selected combination of parameters as parameters after modification.

12. The search/detection apparatus according to claim 11, wherein
the control device selects the one of the plurality of combinations, based on the predetermined fixed number and location information.

13. A search/detection apparatus, comprising:
a generation device, including a voltage or current controlled oscillation device for generating a carrier signal, for modulating the carrier signal by a modulation signal and generating a probe signal for detecting location of a target; a transmitting sensor for radiating the probe signal;
a receiving sensor for receiving the probe signal reflected by the target as an echo signal;
an extraction device for extracting distance information about the target from the echo signal;
an interference detection device for detecting existence of an interference signal other than the echo signal from a signal received by the receiving sensor and outputting a detection signal; and
a control device for modifying a parameter of the carrier signal when receiving the detection signal from the interference detection device.

14. The search/detection apparatus according to claim 13, wherein
the receiving sensor receives a signal including parameter information of another search/detection apparatus which is an interference source,
the extraction device extracts the parameter information from the received signal, and
the control device modifies the parameter of the carrier signal in such a way as to suppress interference, using the extracted parameter information.

15. The search/detection apparatus according to claim 13, further comprising:
a power monitor device for monitoring receiving power of the signal received by the receiving sensor and outputting the receiving power to the control device, and
a reduction device for reducing a radiation level of the probe signal, wherein
when the power monitor device observes excessive receiving power, the control device controls the reduction device to reduce the radiation level of the probe signal, and if the detection signal from the interference detection device is not interrupted, the control device modifies the parameter of the carrier signal.

16. The search/detection apparatus according to claim 13, wherein
the control device changes the parameter of the carrier signal at random according to a hopping sequence.

* * * * *